US005493653A

United States Patent [19]
Schmidt et al.

[11] Patent Number: 5,493,653
[45] Date of Patent: Feb. 20, 1996

[54] COMPUTER GRAPHICS SYSTEM AND METHOD FOR CAPPING VOLUME ENCLOSING POLYHEDRON AFTER SECTIONING

[76] Inventors: Daniel G. Schmidt, 1531 E. 1325 North, Logan, Utah 84321; Steven J. Kommrusch, 2913 Silverwood Dr., Ft. Collins, Colo. 80525; Howard D. Stroyan, 4301 Black Hawk Cir., Ft. Collins, Colo. 80526

[21] Appl. No.: 257,211

[22] Filed: Jun. 7, 1994

Related U.S. Application Data

[63] Continuation of Ser. No. 671,278, Mar. 18, 1991, abandoned.

[51] Int. Cl.$^6$ .................................................. G06F 15/72
[52] U.S. Cl. ................................. 395/134; 395/120
[58] Field of Search ................................. 395/121, 122, 395/134, 135, 120, 134, 139, 133

[56] References Cited

U.S. PATENT DOCUMENTS

| | | | |
|---|---|---|---|
| 3,816,726 | 6/1974 | Sutherland et al. | 395/134 |
| 4,885,703 | 12/1989 | Deering | 395/134 |
| 5,309,550 | 5/1994 | Takahashi | 395/122 |

OTHER PUBLICATIONS

"Principles of Interactive Computer Graphics", William M. Newman, 2nd edition, 1979, McGraw–Hill Inc. pp. 421.
Christiansen et al., "Movie. BYU Training Text", University Press, Brigham Young University, 1983, pp. 10–1 to 10–13.

D. Schmidt, "VIRA, a Visibility Resolving Algorithm for Constructive Solid Geometry Using a Buffer Techniques", Master Thesis, Rensselaer Polytechnic Institute, Aug. 1986, pp. 1–83.

*Primary Examiner*—Mark R. Powell
*Assistant Examiner*—Ba Huynh

[57] ABSTRACT

A computer graphics system and method for capping a polyhedron made up of a plurality of polygons after the polyhedron has been sectioned by a designer to thereby provide a realistic display of the polyhedron. The computer graphics system first comprises at least one processor and at least one memory unit configured with the computer graphics system to process data. The computer graphics system further comprises an input device configured with the computer graphics system to allow the designer to specify the at least one sectioning plane. The computer graphics system further comprises a polyhedron capping module configured in the computer graphics system to instruct the at least one processor how to section and cap the polyhedron against the sectioning plane. The computer graphics system further comprises a display device configured with the computer graphics system to display the capped polyhedron.

30 Claims, 16 Drawing Sheets

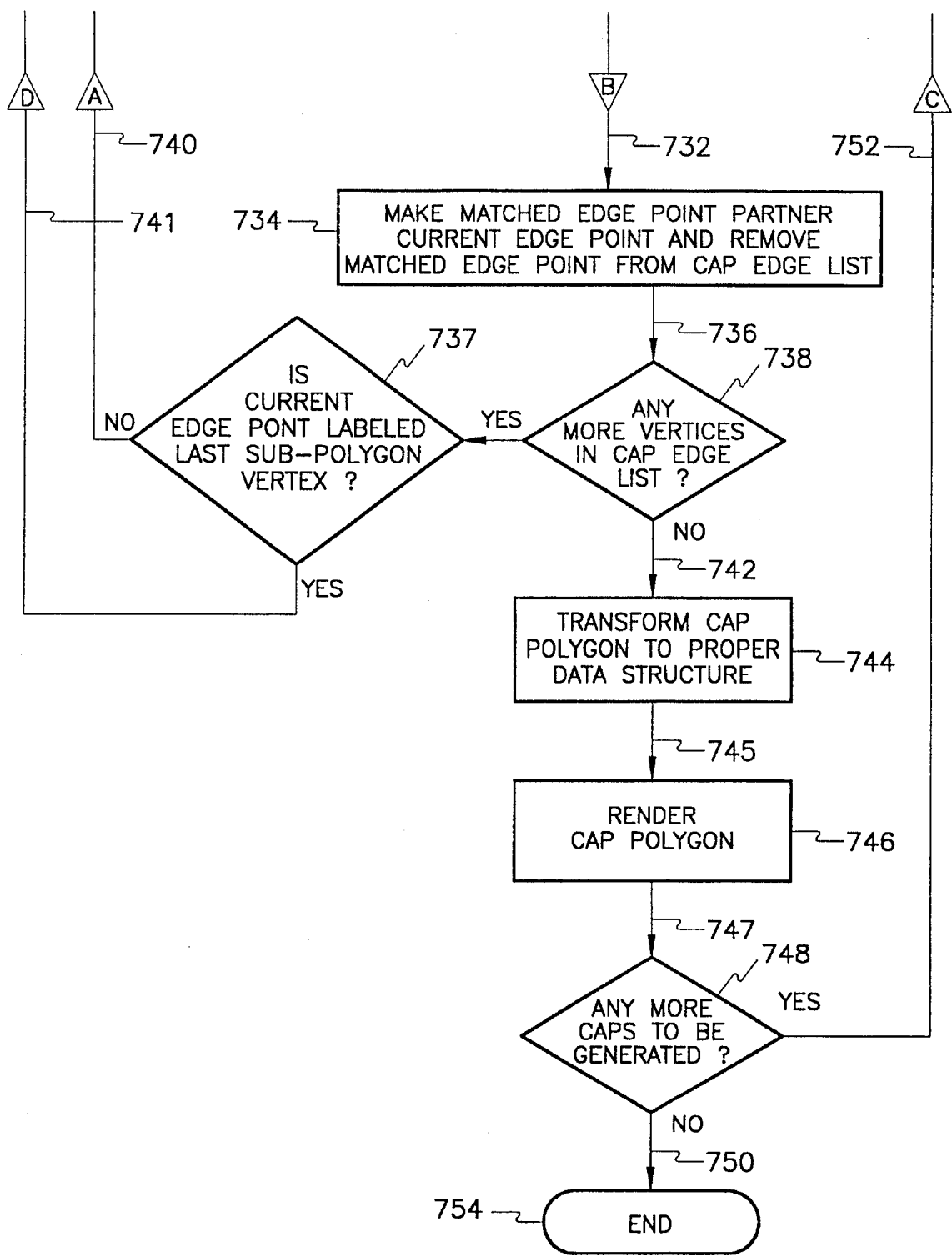
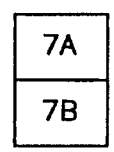
Fig. 7B
Fig. 7

| 8A |
|---|
| 8B |
| 8C |
| 8D |
| 8E |
| 8F |
| 8G |
| 8H |

| 8A |
|---|
| 8B |
| 8C |
| 8D |
| 8E |
| 8F |
| 8G |
| 8H |

| 8A |
|---|
| 8B |
| 8C |
| 8D |
| 8E |
| 8F |
| 8G |
| 8H |

| EDGE ENTRY | FIRST VERTEX | SECOND VERTEX |
|---|---|---|
| 1 | 843 | 844 |
| 2 | 846 | 848 |
| 3 | 852 | 850 |
| 4 | 856 | 854 |

| 8A |
|---|
| 8B |
| 8C |
| 8D |
| 8E |
| 8F |
| 8G |
| 8H |

Fig. 8

COMPUTER GRAPHICS SYSTEM AND METHOD FOR CAPPING VOLUME ENCLOSING POLYHEDRON AFTER SECTIONING

CROPS REFERENCE TO RELATED APPLICATION

This is a continuation of application Ser. No. 07/671,278, filed Mar. 18, 1991, now abandoned.

FIELD OF THE INVENTION

The present invention relates generally to computer graphics systems. More particularly, the present invention relates to computer graphics systems that allow a designer to manipulate three-dimensional objects.

BACKGROUND OF THE INVENTION

Computer graphics systems have been widely used by designers to design objects such as cars, airplanes, tooling, and the like. In recent years, computer graphics systems have been applied to more and more complex jobs. The objects rendered have improved from the early vector displays to photorealistic images.

Computer graphic systems typically employ what is known as primitives to create and display user specified geometric structures. Typical two-dimensional structures are points, lines, circles, and polygons.

Three-dimensional objects often are represented in polyhedral form. Polyhedra, by definition, are three-dimensional solids formed by a set of planar faces or polygons. Curved surfaces of three-dimensional objects are typically approximated by displaying a combination of many small polygons.

Often, designers only want to view a portion of the object. To avoid the rendering problems and clutter inherent in displaying data that is not within the prescribed visible range, graphic systems utilize what is known as a "view clipping" feature. This view clipping feature allows a designer to define a "window" in which a portion of the object is rendered. View clipping is performed using two-dimensional polygon clippers, such as the Sutherland-Hodgman (Sutherland et al., "Reentrant Polygon Clipping", *Communications of the ACM* 17:32–42 (1974)) and the Weiler-Atherton (Weiler et al., "Hidden Surface Removal Using Polygon Area Sorting", *Computer Graphics* 11:214–222 (1977)) methods. These two-dimensional clippers clip the two or three dimensional objects against the defined window.

In contrast to view clipping, designers often want to inspect their designs from within. This is typically known as "sectioning." To accomplish this task, some computer graphics systems allow the designer to define arbitrary planes about the objects. Each plane demarcates two infinite half-spaces, an acceptance half-space or region and a rejection half-space or region. The intersection of the planes with themselves and the object produce cut-away views which expose the interior of the object. Sectioning is a powerful tool for the graphics system designer.

However, conventional computer graphics systems have several disadvantages when employing sectioning. The primary drawback with sectioning is that the internal area of the polyhedral representation of a solid object when rendered appears hollow to the designer. The polygonal shell that is used to represent the three-dimensional object becomes apparent when the sectioned areas are no longer drawn. The reason for this is that conventional computer graphics systems use two-dimensional clippers to section three-dimensional objects. Two-dimensional clippers deal properly with closed polygons in three-dimensional space, but lack robustness when dealing with closed polyhedra. After sectioning, three-dimensional objects become a disjoint collection of polygons and their volume-enclosing property is difficult to restore.

To solve this problem, conventional computer graphics systems often employ techniques such as "back face coloring" in conjunction with application of two-dimensional clippers. Back face coloring sets "back face" attributes of a polygon to display a constant fill color while the front faces of the same polygon are shaded normally. When a sectioning plane exposes the interior of an object, the back face fill color becomes visible, thus reducing the hollow appearance of the object.

Back face coloring techniques have several disadvantages and/or limitations. First, back face coloring does not employ lighting calculations and thus cannot render proper shading perspectives. As such, a sectioned object does not appear realistic. Additionally, rendering of the back face polygons can be a time consuming task.

Work done at Brigham Young University (Christiansen et al., "Movie.BYU Training Text", University Press, Brigham Young University, 1983. This reference is incorporated by reference in its entirety herein.) introduced the concept of capping sectioned polyhedra. This work depended on a large database accumulation of the rejected portions of the object. This approach is limited to systems that have access to the entire polyhedral data base at the same time. Given the graphics pipeline, as described in this invention, where only one polygon is available at a time, a new approach had to be found.

Work done at Rensselaer Polytechnic Institute (RPI) (Schmidt, Daniel G., "VIRA, A Visibility Resolving Algorithm for Constructive Solid Geometry Using A-Buffer Techniques", Masters Thesis, Electrical, Computer and Systems Engineering Department, Rensselaer Polytechnic Institute, August 1986. This reference is incorporated by reference in its entirety herein.) introduced a method for capping on the near view clip plane. The RPI work is limited in that it did not include capping sectioned polyhedra.

SUMMARY OF THE INVENTION

The present invention is a computer graphics system, module, and method configured to cap a polyhedron after the polyhedron has been sectioned, in a pipeline fashion, against a sectioning plane(s) defined by a user. The polyhedron is formed of a plurality of polygons. Each of the polygons has a plurality of edges. Each polygon is sectioned in series, one after the other. Capping closes the polyhedron that has been sectioned to make it appear solid. The cap polygon(s) is coincident with the sectioning plane(s).

In one embodiment, the computer graphics system comprises at least one processor and at least one memory unit configured with the computer graphics system to process data. The computer graphics system further comprises an input device. The input device is configured with the computer graphics system to allow the user to specify the sectioning plane(s). The computer graphics system further comprises a polyhedron capping module. The polyhedron capping module is configured with the computer graphics system to instruct the processor how to section and cap the polyhedron against the sectioning plane(s). The computer graphics system may further comprise a display device. The display device is configured with the computer graphics system to display the capped polyhedron.

The polyhedron capping module generally comprises a sectioning module and a cap formation module. The sectioning module is generally configured to section the polyhedron against the sectioning plane(s). The capping module is generally configured to generate a cap for each sectioning plane.

The sectioning module generally comprises a plane intersect module, an interpolation module, and a cap edge list module. The plane intersect module is configured to determine whether the edges of each of the polygons that make up the polyhedron intersect the sectioning plane(s). The interpolation module is configured to calculate an intersection point for each intersection of an edge and a sectioning plane. The cap edge list module is configured to store the intersection points in a cap edge list. The intersection points may be stored in world coordinates as opposed to modelling coordinates. One cap edge list is generated for each sectioning plane.

The cap formation module comprises a collect edge module, a match cap vertex module, and a transformation module. The collect edge module is configured to collect the intersection points stored in the cap edge list. The match cap vertex module is configured to connect the intersection points stored in each cap edge list into a cap polygon. The cap polygon may consist of sub-polygon caps. The transformation module is configured to transform the cap polygon into a cap polygon data structure compatible with the graphics pipeline architecture.

In another embodiment, the present invention is a computer graphics module configured to operate on a computer graphics system and to manipulate polyhedron formed from a plurality of polygons having a plurality of edges. The computer graphics module comprises a storage medium compatible with the computer graphics system. The computer graphics module further comprises a polyhedron capping module configured on the storage medium to instruct the computer graphics system how to section and cap the polyhedron against sectioning plane(s) defined by the user.

The polyhedron capping module comprises a sectioning module and a cap formation module. The sectioning module is generally configured to section the polyhedron against the sectioning plane(s). The capping module is generally configured to generate a cap for each sectioning plane.

The sectioning module comprises a plane intersect module, an interpolation module, and a cap edge list module. The plane intersect module is configured to determine whether the edges of each of the polygons that make up the polyhedron intersect the sectioning plane(s). The interpolation module is configured to calculate an intersection point for each intersection of an edge and the sectioning plane(s). The cap edge list module is configured to store the intersection points in a cap edge list. The intersection points may be stored in world coordinates as opposed to modelling coordinates. One cap edge list is generated for each sectioning plane.

The cap formation module comprises a collect edge module, a match cap vertex module, and a transformation module. The collect edge module is configured to collect the intersection points stored in the cap edge list. The match cap vertex module is configured to connect the intersection points into a cap polygon. The cap polygon may consist of sub-polygon caps. The transformation module is configured to transform the single cap polygon into a cap polygon data structure compatible with the graphics pipeline architecture.

In another embodiment, the present invention is a computer method of displaying a polyhedron on a computer graphics system as a solid object after the polyhedron has been sectioned about a user defined sectioning plane. The polyhedron is formed from a plurality of polygons each having a plurality of edges. The computer method generally comprises the steps of sectioning the polyhedron about the user defined sectioning plane and generating a cap polygon for each sectioning plane.

The sectioning step comprises the step of determining whether the edges of the polygons intersect the sectioning plane(s). The sectioning step further comprises the step of calculating an intersection point for each intersection of the edges and the sectioning plane. The sectioning step further comprises the step of storing the intersection points in a cap edge list.

The step of generating a cap polygon comprises the step of collecting the intersection points stored in the cap edge list. The step of generating a cap polygon further comprises the step of connecting the intersection points of each cap edge list into a cap polygon. The step of generating a cap polygon may further comprise the step of transforming the cap polygon into a cap polygon data structure compatible with the graphics pipeline architecture.

BRIEF DESCRIPTION OF THE DRAWINGS

The following detailed description of the present invention will be more fully understood by reference to the accompanying drawings in which:

FIG. 8(d) is a cap edge list for the polyhedron of FIG. 8(a);

DETAILED DESCRIPTION OF THE PREFERRED EMBODIMENT

The present invention is a computer graphics system, module, and method configured to cap a polyhedron after it has been sectioned about a sectioning plane(s) in pipelined fashion. Capping makes the rendered object appear solid by closing the polyhedron.

Figure 1:
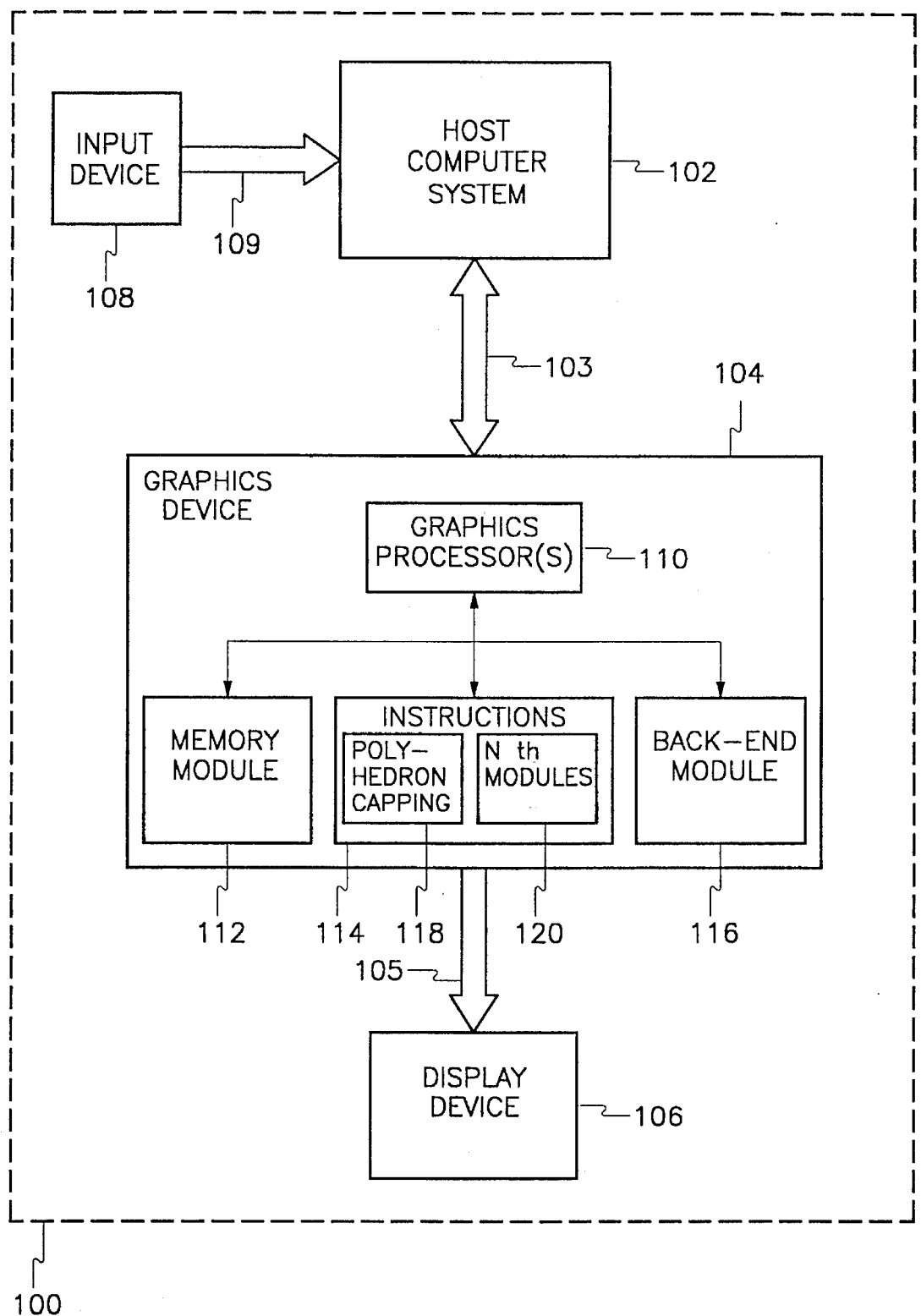
FIG. 1 is a high level block diagram showing the computer graphics system of the present invention.

Referring now to FIG. 1, a high level block diagram of a computer graphics system 100 of the present invention is shown. The computer graphics system 100 generally comprises a host computer system 102 connected to a graphics device 104 via a bus 103. In the preferred embodiment, host computer system 102 is a model HP 375 host computer, available from Hewlett Packard Corporation of Palo Alto, Calif., USA. In the preferred embodiment, graphics device 104 is a model HP 425 VRX Series graphics device, available from Hewlett Packard Corporation of Palo Alto, Calif., USA.

Computer graphics system 100 may further comprise a display device 106 connected to the graphics device 104 via a bus 105. Display device 106 is generally provided to display three-dimensional objects. In the preferred embodiment, display device 106 is that of a conventional 1280× 1024 pixel graphics color terminal available from a variety of electronic distributors.

Computer graphics system 100 may further comprise an input device 108 connected to the host computer 102 via a bus 109. Input device 108 is provided to allow the user (designer) to communicate with the computer graphics system 100. Input device 108 may take many forms. By way of example only, input device 108 may be a key board, a mouse or a joy stick.

Graphics device 104 generally comprises a graphics processor 110, a memory module 112, an instruction module 114, and a back-end module 116. Although not necessarily, graphics processor 110 may be a processor dedicated to performing graphics computations. Memory module 112 provides a storage location so that the graphics processor 110 can carry out necessary tasks. Instruction module 114 provides the graphics processor 110 with instructions for carrying out a variety of graphics related tasks.

Instruction module 114 comprises a polyhedron capping module 118. Although not specifically shown, instruction module 114 will typically comprise many graphics application modules other than the polyhedron capping module 118. Such other graphics application modules are generally denoted as Nth modules 120. Such other Nth modules 120 modules may include, but are not limited to, a scaling module for allowing the user to scale an object, a translation module for allowing the user to translate an object, a rotation module for allowing the user to rotate an object, and/or a lighting module for allowing the user to artificially light an object. As will become obvious to one skilled in the art, the polyhedron capping module 118, to be described herein, can be easily integrated with such other Nth modules 120.

In the preferred embodiment, polyhedron capping module 118 is implemented as micro-code (firmware). However, it should be understood that polyhedron capping module 118 could be embodied in other architectures. By way of example only, polyhedron capping module 118 may have a software and/or hardware architecture. In its software architecture, polyhedron capping module 118 may comprise computer instructions of an application program stored on and/or in a storage media device. By way of example only, such storage media devices may include, but are not limited to, a floppy disk or a random access memory (RAM) device. In its hardware architecture, polyhedron capping module 118 may comprise logic operations implemented in an integrated circuit form, such as an application specific integrated chip (ASIC).

It should also be understood that aside from the polyhedron capping module 118, the computer components/sub systems/devices/modules which make up the computer graphics system 100 are all of conventional design. Any suitable presently available or future developed computer component/sub-systems/devices/modules may be used.

Figure 2:
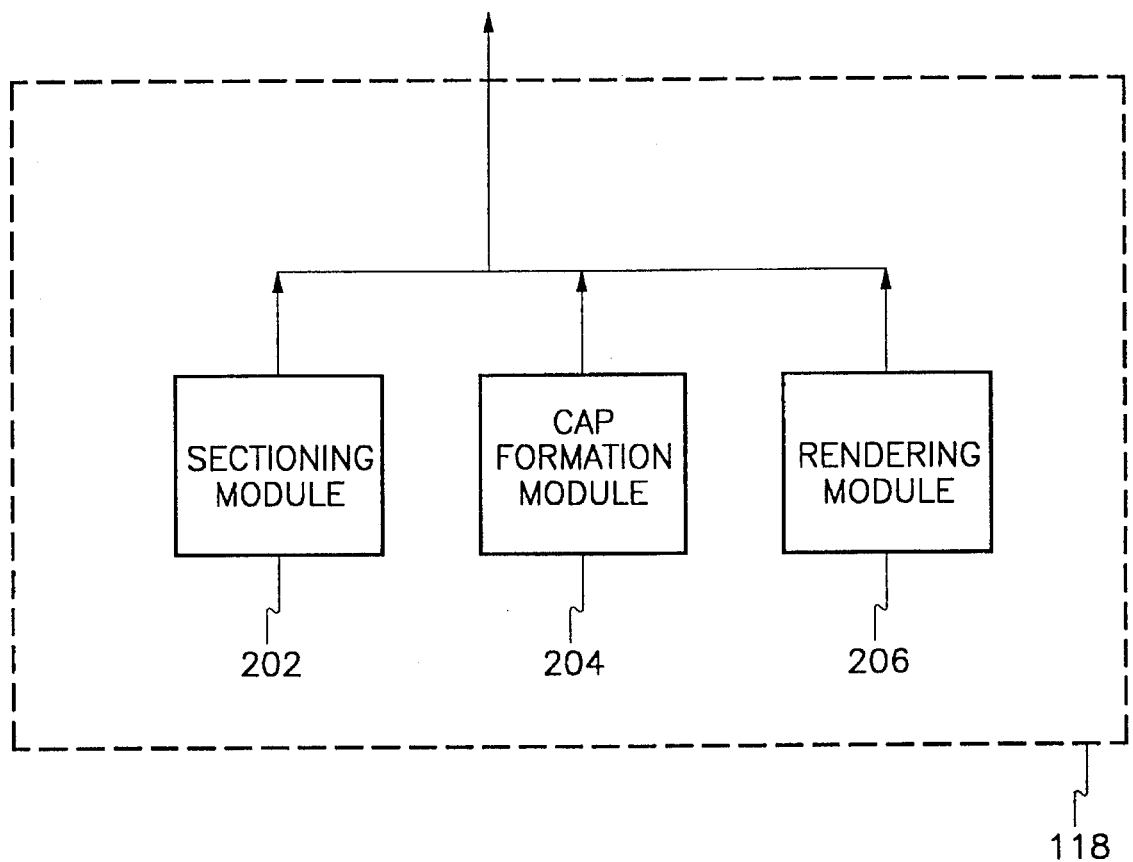
FIG. 2 is a high level block diagram showing the architecture of the polyhedron capping module of the present invention.

A high level architecture block diagram of polyhedron capping module 118 is shown in FIG. 2. Polyhedron capping module 118 generally comprises a sectioning module 202, a cap formation module 204, and a rendering module 206. Sectioning module 202 is generally configured to section (clip) the polyhedron against sectioning planes specified by the user. Cap formation module 204 is generally configured to generate a cap polygon for each sectioning plane. Rendering module 206 is generally configured to display the generated cap polygons on the clipped polyhedron.

Figure 3:
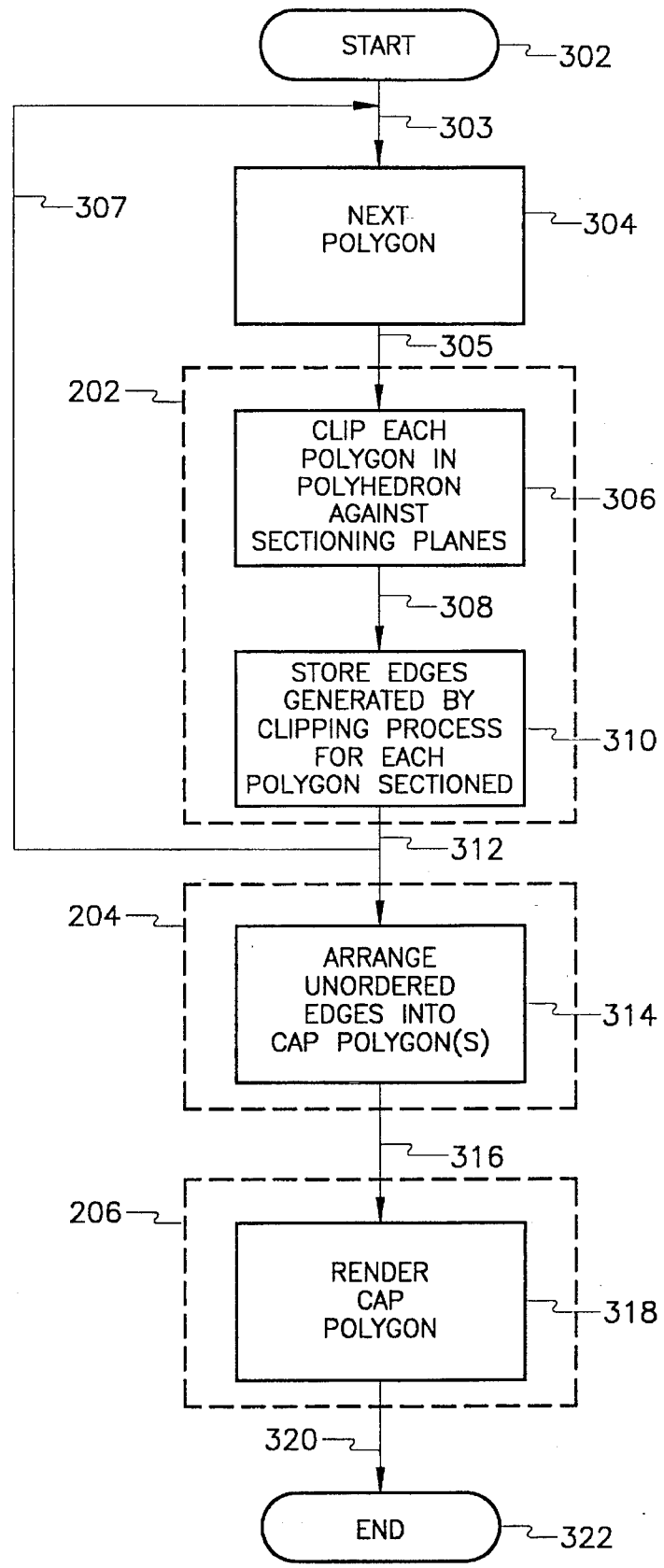
FIG. 3 is a high level flow chart showing the operation of the polyhedron capping module of the present invention.

FIG. 3 is a high level flow chart showing the interoperation of sectioning module 202, cap formation module 204, and rendering module 206. A start block 302 initiates operation. Control is then passed along a logic path 303 to an operational block 304.

As shown by operational block 304, the first polygon of the polyhedron is processed. Control is then passed along a logic path 305 to an operational block 306.

As shown by operational block 306, the sectioning module 202 is called to section (clip) each polygon in the polyhedron against the user defined sectioning plane(s). Control is then passed along a logic path 308 to an operational block 310.

As shown by operational block 310, sectioning module 202 is further configured to collect new polygon edges and intersection points that were generated by the clipping process and to store the intersection points in a cap edge list. Control is then passed along a logic path 312 to an operational block 314.

As shown by operational block 314, after all polygons have been sectioned, cap formation module 204 operates to generate a cap polygon from the collected intersection points. A cap polygon is generated for each sectioning plane. The cap polygon may consist of sub-polygon caps. Control is then passed along a logic path 316 to an operational block 318.

As shown by operational block 318, rendering module 206 then operates to display the generated cap polygons on the existing clipped polyhedron data structure. Control is then passed along a logic path 320 to an end block 322.

Figure 4:
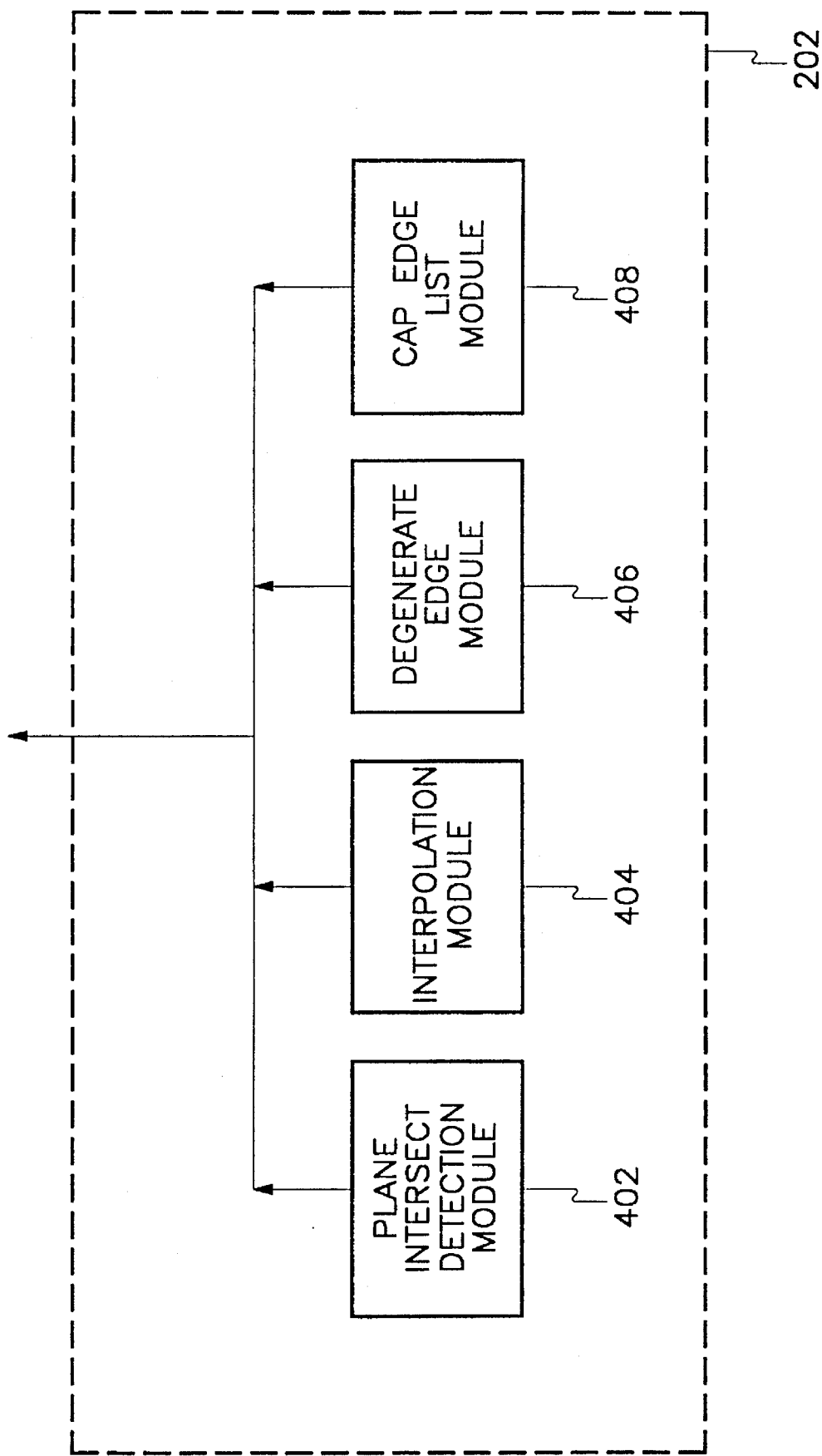
FIG. 4 is a high level block diagram showing the architecture of the sectioning module of the present invention.

Referring next to FIG. 4, a more detailed architectural block diagram of sectioning module 202 is shown. Sectioning module 202 comprises a plane intersect detection module 402, an interpolation module 404, a degenerate edge module 406, and a cap edge list module 408.

Plane intersect detection module 402 is generally configured to determine if the edges of the polygons that make up the polyhedron actually intersect the user defined sectioning plane(s). As will described more fully herein, this task is performed by checking the end points of each edge as they reside with respect to the sectioning plane(s). If the end points of the edge lie on opposite sides of the sectioning plan(s) then the edge does intersect the sectioning plane. If both end points of the edge lie on same side of the sectioning planes (either on the acceptance side of the sectioning plane or on the unacceptable side of the sectioning plane), then the edge does not intersect the sectioning plane.

Interpolation module 404 is generally configured to determine the polygon edge/section plane intersection point (vertex). This operation is necessary in order to accept and, later on, render that portion of the polygon edge that is on the acceptance side of the sectioning plane.

Degenerate edge module 406 is generally configured to remove all degenerate edges that may have been generated by plane intersect detection module 402 and interpolation module 404. Degenerate edges may span areas that were not part of the original polyhedron. If proper capping polygons are to be generated, there can be no degenerate edges in the clipped polygons or the cap edge list. Sutherland and Hodgman described a post-process that could be applied to their algorithm to remove such degenerate edges (Sutherland et al., "Reentrant Polygon Clipping", Communications of , the ACM 17:32–42 (1974)). This reference, in its entirety is hereby incorporated by reference into this specification.

Cap edge list module 408 is generally configured to store the intersection points indicative of the new polygon edges generated by the clipping process heretofore described. As will be discussed more fully herein, the cap edge list module 408 provides a data base from which the capping module 204 can generate cap polygons.

Figures 5, 5A:
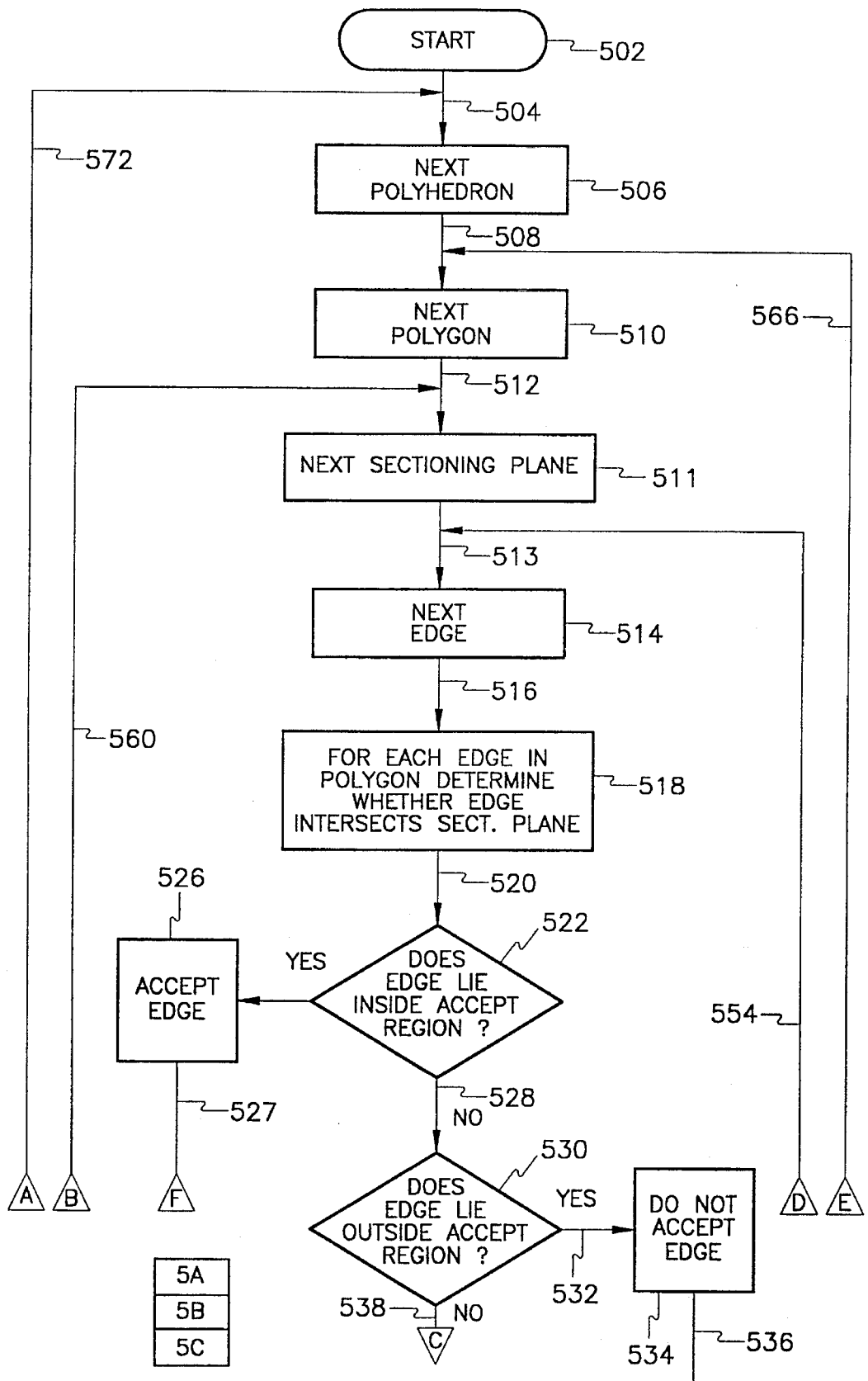
FIG. 5 is a high level flow chart showing the operation of the sectioning module of the present invention.

FIG. 5 is a high level flow chart describing the operation of the sectioning module 202 and the inter-operation of plane intersect detection module 402, interpolation module 404, degenerate edge module 406, and cap edge list module 408. However, in order to understand FIG. 5, several concepts and/or practical operations need to be identified. First, the computer graphics system 100 may often be used to design, for example, a mechanical engine. The mechanical engines typically have many parts. Each part may be one polyhedron. Each polyhedron is made up of many polygons. In a pipeline architecture, polygons are passed down the pipeline one at a time. Pipeline architecture has proven to be a fast method of rendering objects.

Figures 5, 5B:
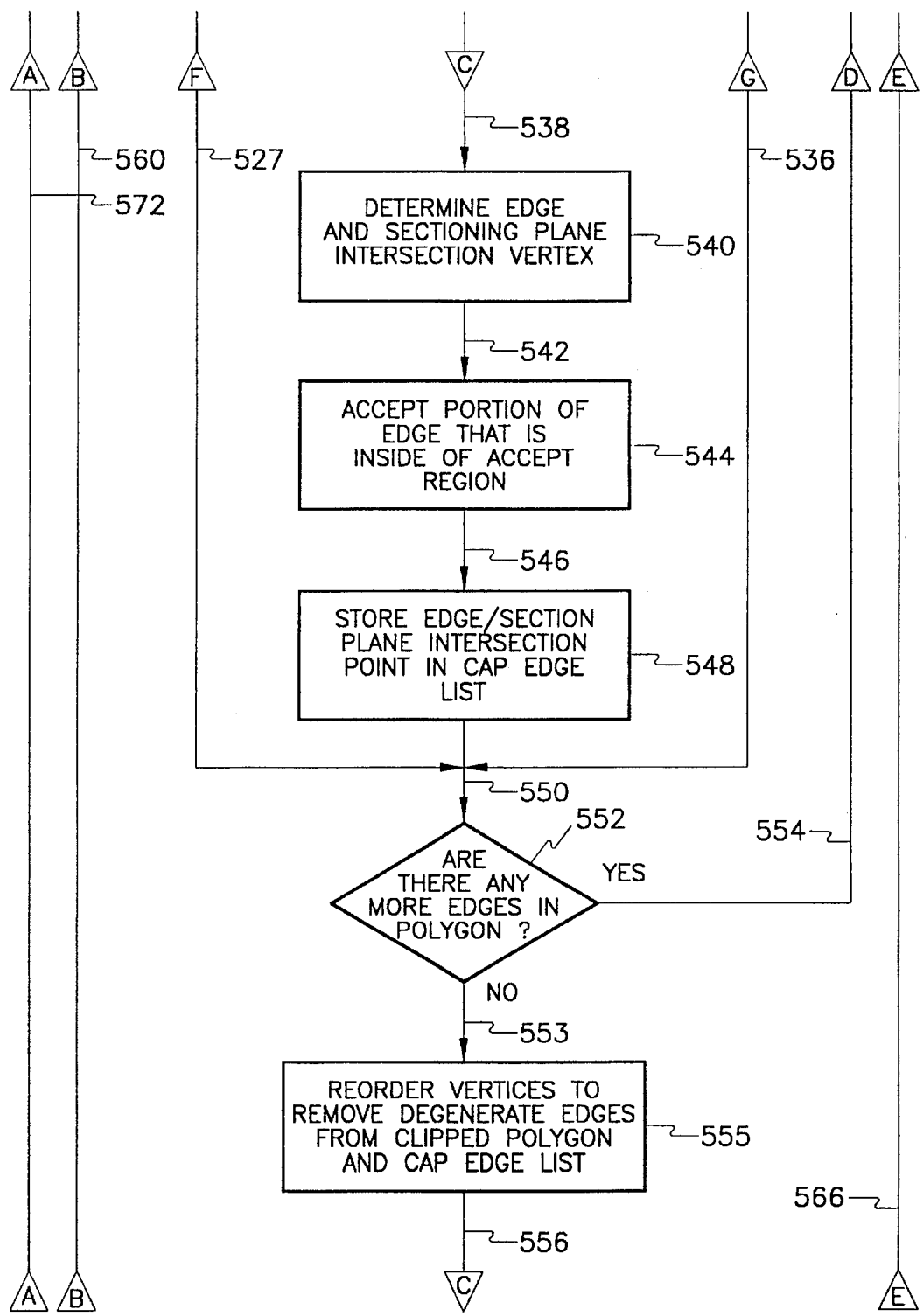
Figures 5, 5C:
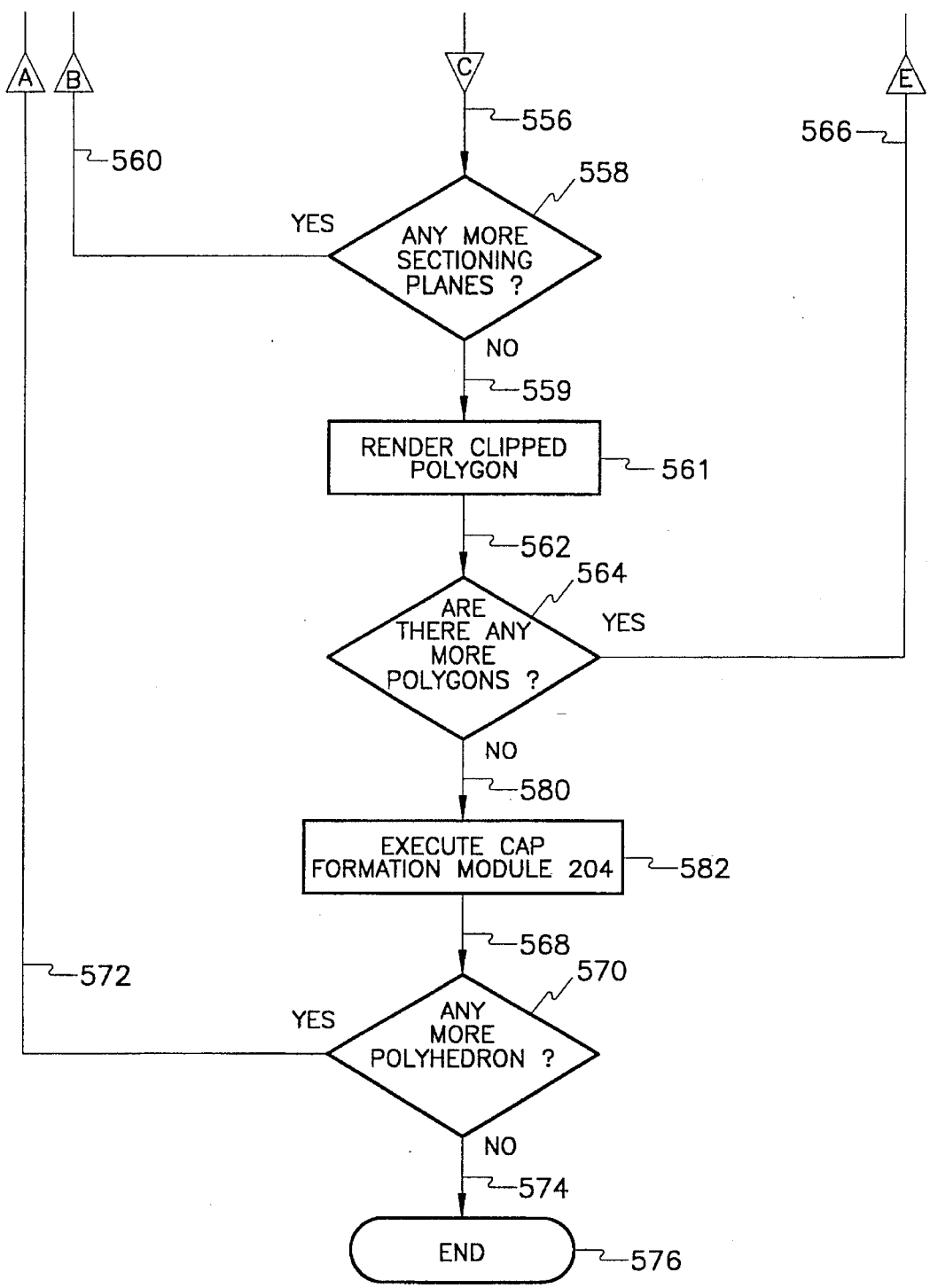

Referring now to FIG. 5. FIG. 5 consists of FIGS. 5A, 5B, and 5C. A start block 502 initiates operation of sectioning module 202. Control is then passed along a logic path 504 to an operational block 506.

As shown by operational block 506, the sectioning module 202 is configured to accept the first polyhedron passed down the pipeline. Control is then passed along a logic path 508 to an operational block 510.

As shown by operational block 510, the sectioning module 202 is next configured to accept the first polygon from the first polyhedron. Control is then passed along a logic path 512 to an operational block 511.

As shown by operational block 511, the sectioning module 202 is then configured to accept the first user defined sectioning plane. Control is then passed along a logic path 513 to an operational block 514.

As shown by operational block 514, the sectioning module 202 is then configured to accept the first edge of the first polygon. Control is then passed along a logic path 516 to an operational block 518.

As shown by operational block 518, the sectioning module 202 is then configured to determine whether the current edge under examination intersects the user defined sectioning plane(s). This operation is performed using the following plane equation:

$$A_x + B_y + C_z + D = 0 \qquad \text{Eq. 1}$$

For example, given a known point, $[x_1, y_1, z_1]$ on a sectioning plane and normal vector, [A B C], D of the plane equation (Eq. 1) is computed as follows:

$$D = -(Ax_1 + By_1 + Cz_1) \qquad \text{Eq. 2}$$

Substituting a known edge point, p, into the plane equation (Eq. 2) tells us whether the edge point is inside or outside the acceptance region by the following relationship:

$$Ap_x + Bp_y + Cp_z + D \begin{cases} > 0 \; p \text{ is inside the acceptance region} \\ = 0 \; p \text{ is on the boundary} \\ < 0 \; p \text{ is outside the acceptance region} \end{cases} \qquad \text{Eq. 3}$$

Control is then passed along a logic path 520 to a decisional block 522.

As shown by decisional block 522, if the edge lies fully inside of the acceptance region, then control is passed along a logic path 524 to an operational block 526. As shown by operational block 526, the edge is accepted and control is returned along a logic path 527 and logic path 550 to decisional block 552 where the next edge in the pipeline is processed. If, however, the edge is not fully inside the acceptance region, then control is passed along a logic path 528 to a decisional block 530.

As shown by decisional block 530, sectioning module 202 is then configured to determine whether the edge lies fully outside of the acceptance region. If the edge lies fully outside the acceptance region, then control is passed along a logic path 532 to an operational block 534. As shown by operational block 534, the edge is not accepted and control is returned along a logic path 536 and logic path 550 to decisional block 552 where the next edge in the pipeline is processed. If, however, the edge is not fully outside the acceptance region, then control is passed along a logic path 538 to an operational block 540.

As shown by operational block 540, the sectioning module 202 is then configured to determine the point (vertex) at which the edge intersects the sectioning plane. This is hereby defined as the intersection point. Calculation of the intersection point is necessary so that the fraction of the line that is outside the acceptance region can be computed and thereafter clipped.

For example, if S and E represent the end points of the edge that are respectively outside and inside of the acceptance region, let I represent the point of intersection between the edge and the plane. Distances between S and both E and a given sectioning plane provide similar triangles from which the intersection point is given by $$I_x = S_x + \alpha x, \; I_y = S_y + \alpha \Delta y, \; I_z = S_z + \alpha \Delta z. \qquad \text{Eq. 4}$$

where α is the fraction of the line from S to the plane, $(0 \leq \alpha \leq 1.0)$, $$\alpha = \frac{-(AS_x + BS_y + CS_z + D)}{(A\Delta x + B\Delta y + C\Delta z)} \qquad \text{Eq. 5}$$

and $$\Delta x = E_x - S_x, \; \Delta y = E_y - S_y, \; \Delta x = E_z - S_z. \qquad \text{Eq. 6}$$

If S and E are end points of the edge and the results of the plane equation as applied to S and E in operational block 518 are $R_s$ and $R_e$, then:

$R_s = AS_x + BS_y + CS_z + D$,
$R_e = AE_x + BE_y + CE_z + D$ and, $$\alpha = \frac{R_s}{R_s - R_e} \qquad \text{Eq. 7}$$

Upon sectioning module 202 calculating the intersection point, control is passed along a logic path 542 to an operational block 544.

As shown by operational block 544, the sectioning module 202 is then configured to accept that portion of edge that is inside the acceptance region. Because the intersection point has been determined by operational block 540, sectioning module 202 can easily accept that portion of the line beginning at the end point and finishing at the intersection point. Depending on the normal vector of the sectioning plane, either one of the end points may lie in the acceptance region. Control is then passed along a logic path 546 to an operational block 548.

As shown by operational block 548, the sectioning module 202 is then configured to store the intersection point in a cap edge list. Once all the original polygons that make up the polyhedron have been sectioned and closed, the cap polygons, one for each clipping plane, will have been saved as disjoint edges and intersection points in the cap edge list(s). These disjoint edge lists each contain all the edges generated while clipping all the polygons against a given sectioning plane. As will be more fully described with respect to cap formation module 204, the polyhedron capping module 118 is further configured to re-order the disjoint collection of vertices of each cap edge list into a complete cap polygon data structure.

The vertices in the cap edge list are termed disjoint because the vertices are in no particular order. However, the vertices that make up a given edge are known. This is because the order of the polygons sent down the pipe line architecture may be random within the context of each polyhedron. Nevertheless, the combination of the new vertices, and thus edges, can define a new closed polygon which is guaranteed to close the polyhedron with respect to the sectioning plane that created it. It should be understood that because the polyhedron may be concave, the cap polygons may be made up of several sub-polygons, have holes or appear otherwise concave. Additionally, a cap polygon may be made up of two or more disconnected sub-polygons. Control is then passed along a logic path 550 to a decisional block 552.

As shown by decisional block 552, the sectioning module 202 is then configured to determine whether there are any more edges in the polygon under evaluation. If additional edges exist, then control is returned along a logic path 554 to operational block 514 where the next edge in the pipeline is processed. If no additional edges exist in the polygon, then control is passed along a logic path 553 to an operational block 555.

As shown by operational block 555, the sectioning module 202 is then configured to reorder the vertices to remove degenerate edges from the clipped polygon and the cap edge list. Control is then passed along a logic path 556 to a decisional block 558.

As shown by decisional block 558, the sectioning module 202 is then configured to determine whether the polygon being processed in the pipeline has been clipped with respect to all the user defined sectioning planes. If additional sectioning planes exist, then control is returned along a logic path 560 to operational block 511 where the same polygon is clipped against the next sectioning plane. If no additional sectioning planes exist, then control is passed along a logic path 559 to an operational block 561.

As shown by operational block 561, the sectioning module 202 is then configured to render the clipped polygon. Control is then passed along a logic path 562 to a decisional block 564.

As shown by decisional block 564, the sectioning module 202 is then configured to determine whether any more polygons exist in the polyhedron. If additional polygons exist, then control is passed along a logic path 566 to operational block 510 where the next polygon in the pipeline is processed. If no additional polygons exist, then control is passed along a logic path 580 to an operational block 582.

Operational block 582 is the execution block for the cap formation module 204. Cap formation module 204 will be described more fully herein. Cap formation module 204 operates to generate the cap for each defined sectioning plane using the cap edge list(s). Control is then passed along a logic path 568 to a decisional block 570.

As shown by decisional block 570, the sectioning module 202 is then configured to determine whether any more polyhedra exist. The object can be made up of many polyhedra and each polyhedron can be separately capped as desired by the user. If additional polyhedra exist, then control is passed along a logic path 572 to operational block 506 where the next polyhedron in the pipeline is processed. If no additional polyhedra are present, then control is passed along a logic path 574 to an end block 576.

Figure 6:
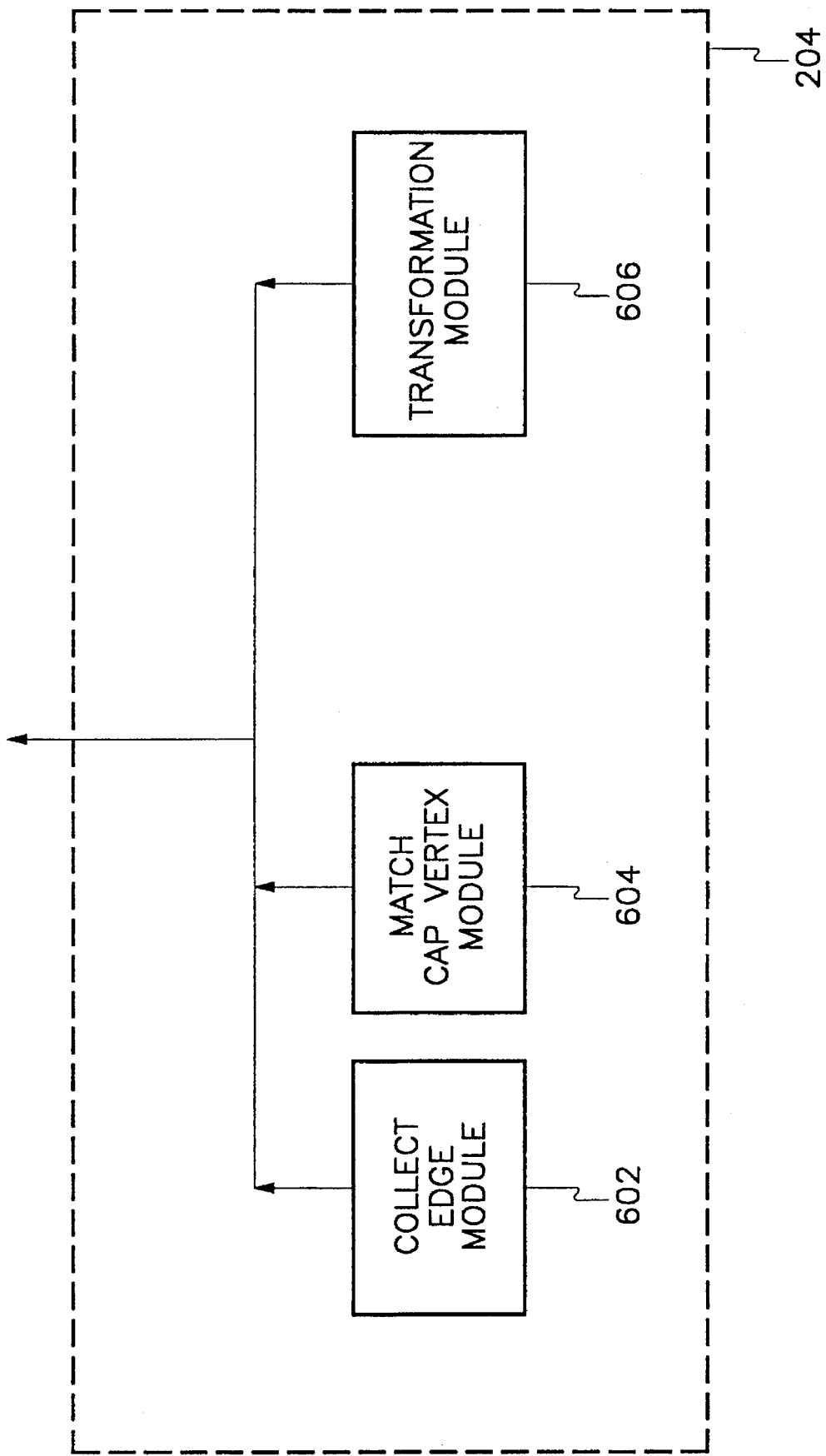
FIG. 6 is a high level block diagram showing the architecture of the cap formation module of the present invention.

FIG. 5 heretofore described is a high level flow chart showing the operation and configuration of sectioning module 202. Following is the pseudo-code for the sectioning module 202:

for each polyhedron:

for each polygon in polyhedron:

for each sectioning plane:

for each edge of polygon:

if both end points lie inside: trivially accept this edge;

else if both end points lie outside: trivially reject this edge;

else: calculate the vector/plane intersection; update the offending end point; remove degenerate edges; add new polygon edges to the cap edge list; render the clipped polygon;

Referring next to FIG. 6, a more detailed description of cap formation module 204 is shown. Cap formation module 204 is generally configured to reorder the set of edges (stored as vertices) in the cap edge list(s) into an ordered vertex description of a cap polygon. The cap polygon may consist of sub-polygon caps. Cap formation module 204 generally comprises a collect edge module 602, a match cap vertex module 604, and a transformation module 606 (See FIG. 6).

Collect edge module 602 is generally configured to collect the cap edges from the cap edge list that were generated by the sectioning module 202. Caps are collected independently for each sectioning plane. As such, the model to world transformation matrix may be changed during rendering without affecting the capping procedure.

Match cap vertex module 604 is generally provided to join the vertices of all the edges in the cap edge list into a cap polygon. The cap polygon may consist of sub-polygon caps.

Transformation module 606 is generally provided to transform the cap polygon into a data structure suitable for rendering and/or overlaying on the clipped polyhedron.

Figures 7, 7A:
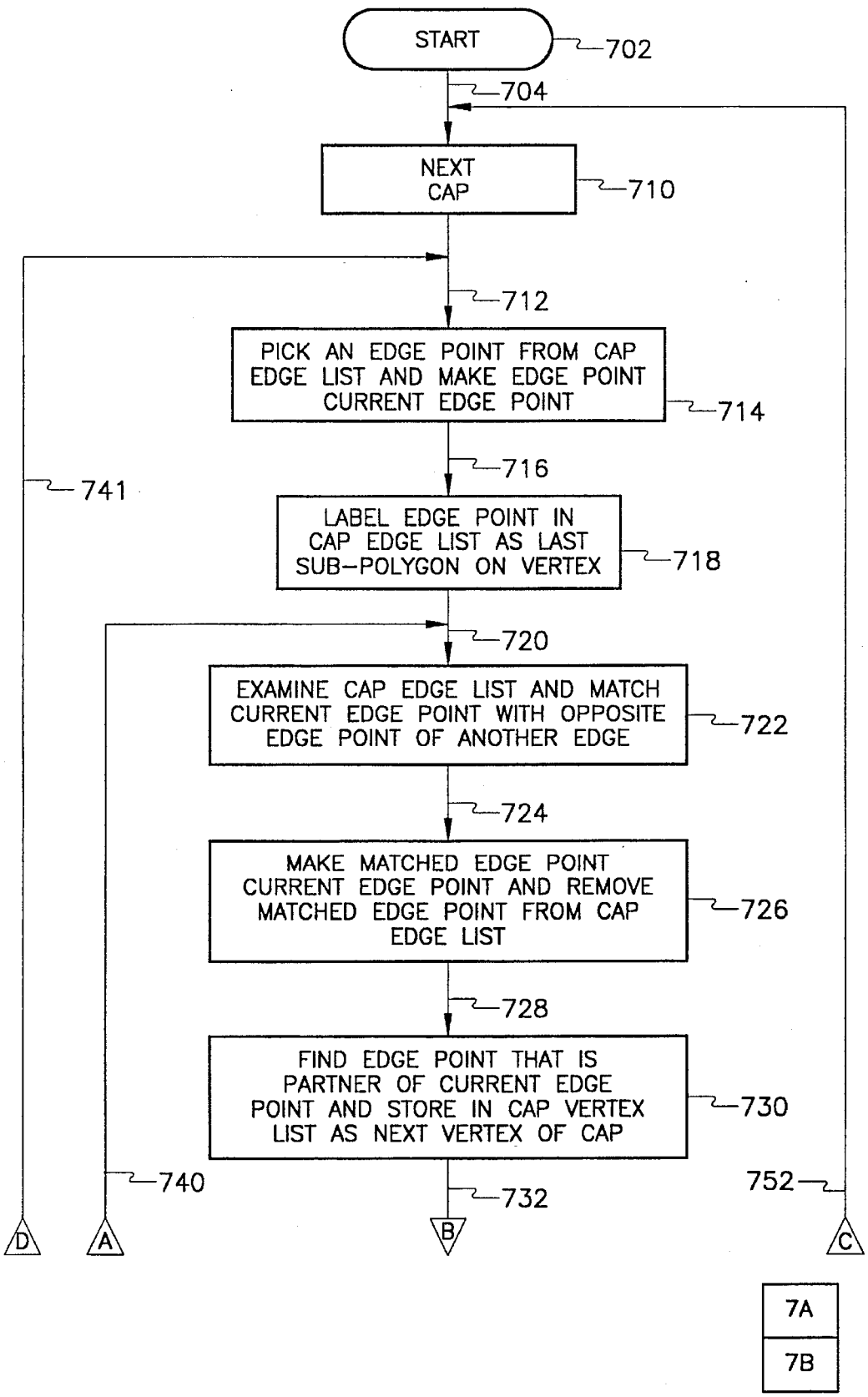
FIG. 7 is a high level flow chart showing the operation of the cap formation module of the present invention.

Referring next to FIG. 7, a high level flow chart represents the operation of cap formation module 204 and the inter-operation of collect edge module 602, match cap vertex module 604, and transformation module 606. A start block 702 initiates operation of cap formation module 204. Control is then passed along a logic path 704 to an operational block 710.

As shown by operational block 710, the cap formation module 204 is first configured to process the first cap edge list. One cap edge list is generated for each sectioning plane and thus one cap polygon will be generated for each sectioning plane. Control is then passed along a logic path 712 to an operational block 714.

As shown by operational block 714, the cap formation module 204 is then configured to pick a vertex from the cap edge list. The vertex can be arbitrarily chosen or could be the first vertex stored in the cap edge list. Cap formation module 204 is further configured to make the chosen vertex as the current vertex. Control is then passed along a logic path 716 to an operational block 718.

As shown by operational block 718, the cap formation module 204 is then configured to label the chosen vertex in the cap edge list as the last sub-polygon vertex. Control is then passed along a logic path 720 to an operational block 722.

As shown by operational block 722, the cap formation module 204 is further configured to examine the cap edge list and match the chosen vertex with the closest vertex remaining in the cap edge list. This operation is performed as follows.

Recall that as the sectioning module 202 executes the clipping process, the edges of the cap polygons accumulate as edge end-point pairs. After all the polyhedron's polygons have been processed, each endpoint must ideally equal at least one other edge's end-point. The problem that must be overcome is a by-product of the floating-point intersection calculations that produced each of these end-points. Significant roundoff error may be introduced, especially when 32-bit floating point precision is used. This is further complicated by the fact that the original data may have had similar errors creating small gaps between the polygons, particularly when the polygons did not share vertices in a mesh structure.

To reconnect the edges of the cap edge list, each point must be compared with every other point in the cap edge list to find the geometrically closest point in three dimensions. This turns out to be a comparison of the magnitudes of each of the vectors formed by using one point as the start point and each of the remaining points as the end point. Because the absolute magnitudes must be compared, the magnitude squared may be used. This is computed as the sum of the squares of $\Delta x$, $\Delta y$, and $\Delta z$. On the average, each match requires $(n-1)/2$ such compares, where n is the number of edges in the cap polygon.

If we assume, however, that all end points that lie within some small distance, $\epsilon$, of each other can be matched together without regard to which is literally closest, then an imaginary sphere can be drawn around each point. If two point lie within the same sphere (the magnitude squared is less than $\epsilon^2$), we can match the two points and move on. Using this technique, we save an average of half the comparisons that had to be made to find the closest match. The allowable small distance, $\epsilon$, than can be used is defined as the average_edge_length/10,000. This approximation has found to be quite acceptable in matching two vertices which have slightly differing locations.

In addition, the matching process of operational block 718 can be further simplified by allowing the magnitude of the vertex location to be approximated and compared with an approximated sphere. The sphere is approximated as a cube centered at the point in question with an edge length of 2e.

Now we can quickly compare $|\Delta x|$ against $\epsilon$. If it is too large we can immediately move on to the next point because the first point cannot lie within the cube. If $|\Delta x|$ is small enough then we compare $|\Delta y|$ to e. Again, if the radius is too small to accommodate $|\Delta y|$, then the point can be rejected, otherwise $|\Delta z|$ is compared and the test is repeated for the final time.

Control is then passed along a logic path 724 to an operational block 726.

As shown by operational block 726, cap formation module 204 is then configured to make the matched vertex the current vertex and to remove the matched vertex from the cap edge list. Control is then passed along a logic path 728 to an operational block 730.

As shown by operational block 730, cap formation module 204 is then configured to examine the cap edge list and locate the edge partner of the current vertex. Cap formation module 204 is further configured to store the partner of the current vertex in the cap vertex list. The cap vertex list is hereby defined as an ordered list of the edges of the cap polygon. Recall that edges are stored as a pair of end vertices. As such, knowledge of one end point, results in knowledge of the opposite end point. Control is then passed along a logic path 732 to an operational block 734.

As shown by operational block 734, cap formation module 204 is then configured to make the matched vertex partner the current vertex and to remove the matched vertex partner from the cap edge list. Control is then passed along a logic path 736 to a decisional block 738.

AS shown by decisional block 738, cap formation module is then configured to check whether any more vertices remain in the current cap edge list. If additional vertices remain in the cap edge list, then control is passed along a logic path 739 to decisional block 737. If, however, no additional vertices remain in the cap edge list, then control is passed along a logic path 742 to an operational block 744.

As shown in decisional block 737, the cap formation module 204 is then configured to check whether the current edge point was labeled as the last sub-polygon vertex by operational block 718. If the current edge point is so labeled, control is returned along logic path 741 to operational block 714 where a new sub-polygon cap vertex list is started. If it is not so labeled, control is returned along logic path 740 to operational block 722 where the current vertex is matched with the closest vertex that remains in the cap edge list.

As shown by operational block 744, cap formation module 204 is then configured to transform the cap polygon data structure into a data structure compatible with the graphics pipeline architecture. This is necessary so that the cap polygon can be properly displayed by rendering module 706. Control is then passed along a logic path 745 to an operational block 746 where the cap polygon is rendered. Control is then passed along a logic path 747 to a decisional block 748.

As shown by decisional block 748, cap formation module 204 is then configured to determine whether any additional caps need to be generated. If additional caps need to be generated, then control is passed along a logic path 752 to operational block 710 where the next cap edge list is processed. If, however, no additional caps need to be rendered, then control is passed along a logic path 750 to an end block 754 where operation of cap formation module 204 is terminated.

FIG. 7 as heretofore described is a high level flow chart showing the operation and configuration of cap formation module 204. Following is the pseudo code for the cap formation module 204:

for each edge in cap edge list add length to total calculate e as average_edge_length/10000.

for each vertex V1 in cap edge list label V1 as last sub-polygon vertex.

Do
    Search cap edge list for vertex V2 that is closer than $\epsilon$ to V1.
    Set V1 to be edge partner of V2.
    Remove V2 from cap edge list.

Add V1 to cap vertex list.
Remove V1 from cap edge list.
While V1 is not labeled as last sub-polygon vertex
Transform ordered cap vertex list into compatible polygon structure.
Render cap polygon.

Figures 8, 8A:
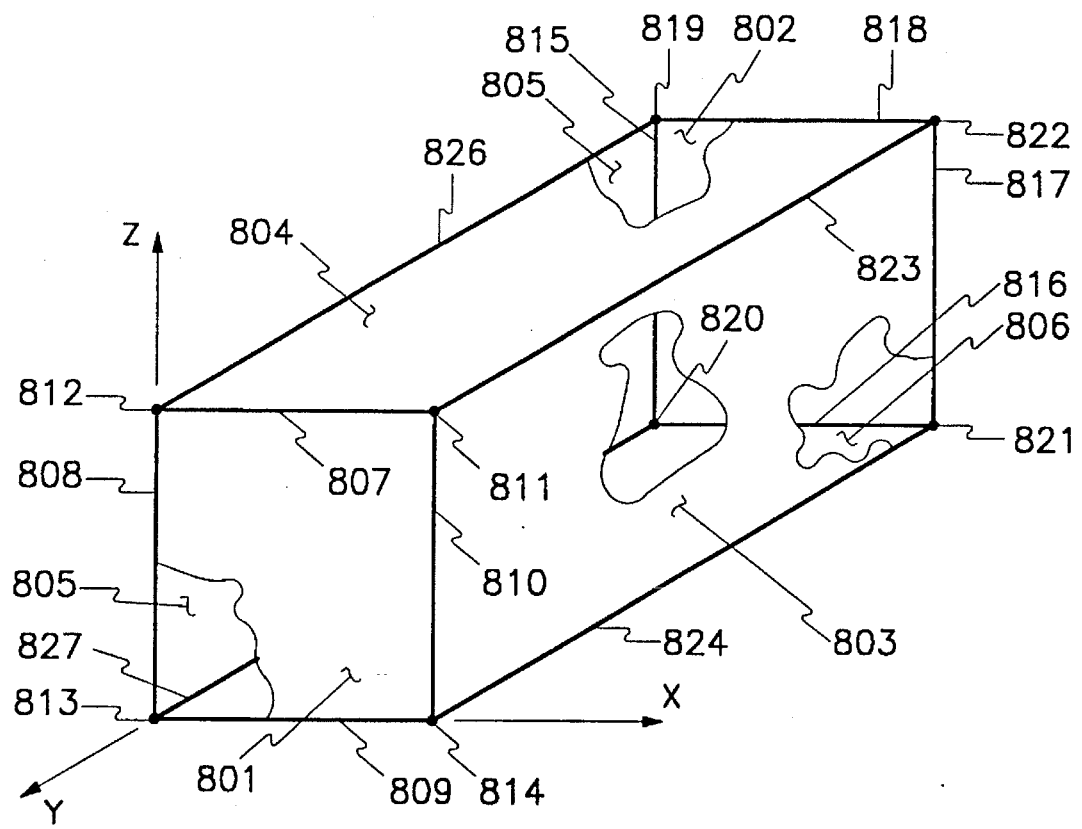
FIG. 8 is comprised of FIGS. 8(a)–(h), where
FIG. 8(a) is a perspective view of a solid polyhedron to be capped by the present invention.
Figures 8, 8B:
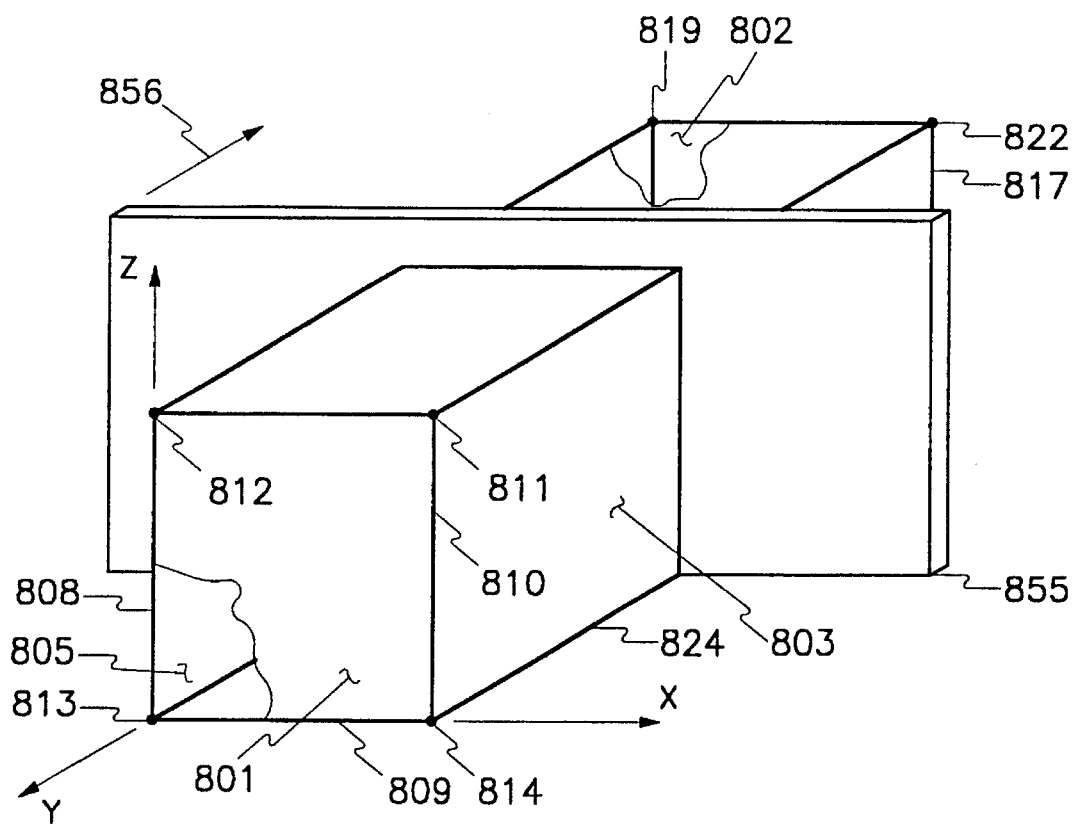
FIG. 8(b) is a perspective view of the polyhedron of FIG. 8(a) that shows a user defined sectioning plane.

Operation of the polyhedron capping module 118 of the present invention will now be further described with reference to the FIGS. 8(*a*)–(*h*), wherein a solid polyhedron 800 is shown. As shown by FIG. 8(*a*), polyhedron 800 is made up of six polygons; polygons 801–806, respectively. Although cut-away views are shown in FIGS. 8(*a*)–(*h*) for ease of discussion and identification of the polyhedron 800 features, in operation, polyhedron 800 is a solid object.

Polygon 801 is formed of edges 807–810, respectively. Edges 807–810 are connected by vertices 811–814.

Polygon 802 is formed of edges 815–818. Edges 815–818 are connected by vertices 819–822, respectively.

Polygon 803 is formed of edges 823, 824, 810, and 817. Edges 810 and 817 of polygon 803 are shared (common) with polygons 801 and 802, respectively. Edge 823 is formed by connection of vertices 811 and 822. Edge 824 is formed by connection of vertices 814 and 821.

Polygon 804 is formed of edges 807, 818, 823 and 826. Edges 807, 818, and 823 of polygon 804 are shared with polygons 801, 802, and 803, respectively. Edge 826 is formed by connection of vertices 812 and 819.

Polygon 805 is formed of edges 808, 815, 826, and 827. Edges 808, 815, and 826 of polygon 805 are shared with polygons 801, 802, and 804, respectively. Edge 827 is formed by connection of vertices 813 and 820.

Polygon 806 is formed of edges 809, 816, 824, and 827. Edges 809, 816, 824, and 827 of polygon 806 are shared with polygons 801, 801, 803, and 805, respectively.

Referring next to FIG. 8(*b*), the user has specified a sectioning plane 855 having a normal vector 856. The direction of normal vector 856 defines the acceptable region to which the polyhedron 800 is clipped by sectioning module 202.

The following discussion of the operation of polyhedron capping module 118 will be made with continual reference to FIGS. 5 and 7. As discussed above, FIG. 5 is the flow chart showing the operation of sectioning module 202. FIG. 7 is the flow chart showing the operation of cap formation module 204.

As shown by operational block 506 of FIG. 5, the polyhedron 800 is passed down the pipeline. As shown by operational block 510, the first polygon of polyhedron 800 is processed. For purposes of this discussion, assume that polygon 801 is the first polygon passed down the pipeline, polygon 802 the second, and so forth with polygon 806 being the last polygon of polyhedron 800 in the pipeline.

As shown by operational block 514, the first edge of the first polygon in the pipeline (polygon 801) is processed by sectioning module 202. For purposes of this discussion, assume that edge 807 is the first edge passed down the pipeline, edge 808 the second edge, and so forth, with edge 810 being the last edge of polygon 801 in the pipeline.

As shown by operational block 518, sectioning module 202 first operates to determine whether the edge 807 intersects the sectioning plane 855. As shown by decisional block 522, sectioning module 202 decides whether edge 807 lies fully inside the acceptance region. In the present case, edge 807 does not lie fully within the acceptance region. As such, control is passed to decisional block 530 where sectioning module 202 decides if edge 807 lies fully outside the acceptance region. In the present case, edge 807 lies fully outside the acceptance region. Control is then passed to operational block 534, where sectioning module 202 does not accept edge 807. In other words, edge 807 will not be later clipped. Control is then passed to decisional block 552, to determine if more edges must be processed.

In the present example, we have defined edge 808 as the next edge in the pipeline. Edge 808 is processed the same as edge 807 described above. As such, sectioning module 202 determines that edge 808 is also fully outside the acceptance region and does not accept edge 808. Control is then returned to operational block 514, where the next edge of polygon 801 is processed.

In the present example, we have defined edge 809 as the next edge in the pipeline. Edge 809 is processed the same as edge 807 described above. As such, sectioning module 202 also determines that edge 809 is fully outside the acceptance region and does not accept edge 809. Control is then returned to operational block 514, where the next edge of polygon 801 is processed.

In the present example, we have defined edge 810 as the next edge in the pipeline (edge 810 is also the last edge in polygon 801). Edge 810 is processed the same as edge 807 described above. As such, sectioning module 202 also determines that edge 810 is fully outside the acceptance region and does not accept edge 810. Because edge 810 is the last edge in the polygon 801, control is passed to operational block 555 where sectioning module 202 finds that no edges remain in the clipped polygon so control is passed to decisional block 558 where sectioning module 202 determines that no additional sectioning planes exist. Control is then passed to operational block 561.

As shown by operational block 561, sectioning module 202 is configured to render the clipped polygon. However, in the present case, polygon 801 has been totally rejected. Control is then passed to decisional block 564.

As shown by decisional block 564, sectioning module 202 determines that additional polygons need to processes. As such, control is returned to operational block 510 where the next polygon in the pipeline (polygon 802) is processed.

For purposes of this example, assume that the edges of polygon 802 are stacked in the pipeline as follows: edge 815, edge 816, edge 817, and edge 818. As shown by decisional block 522, sectioning module 202 determines that edge 815 lies fully inside the acceptance region (unlike edges 807–810, previously discussed). As such, control is passed to operational block 526 where edge 815 is accepted. Control is then returned to operational block 514 where the next edge in the pipeline (edge 816 in the present example) is processed.

Edge 816 is processed the same as edge 815 described above. As such, sectioning module 202 determines that edge 816 is fully inside the acceptance region and accepts edge 816. Control is then returned to operational block 514, where the next edge of polygon 802 is processed. In the present example, we have defined edge 817 as the next edge of polygon 802 in the pipeline.

Edge 817 is processed the same as edge 815 described above. As such, sectioning module 202 determines that edge 817 is fully inside the acceptance region and accepts edge 817. Control is then returned to operational block 514, wherein the next edge of polygon 802 is processed. In the present example, we have defined edge 818 as the next edge in the pipeline (edge 818 is also the last edge in polygon 802).

Edge 818 is processed the same as edge 815 described above. As such, sectioning module 202 determines that edge 818 is fully inside the acceptance region and accepts edge 818. Because edge 818 is the last edge in polygon 802, and because no other sectioning planes exist, control is eventually passed to operational block 510 where the next polygon in the pipeline (polygon 803) is processed. Polygon 802 is rendered in operational block 561.

For purposes of this example, assume that the edges of polygon 803 are stacked in the pipeline as follows: edge 810, 824, 817, and 823. As shown by decisional block 530, sectioning module 202 determines that edge 810 lies fully outside the acceptance region. As such, control is passed to operational block 534 where edge 810 is not accepted. Control is then returned to operational block 514 where the next edge in the pipeline (edge 824 in the present example) is processed.

As shown by decisional block 522, sectioning module 202 determines that edge 824 does not lie fully inside the acceptance region. As such, control is passed to decisional block 530 where sectioning module 202 determines that edge 824 does not lie fully outside the acceptance region. As such, control is passed to operational block 540 where an intersection point 843 of edge 824 and sectioning plane 855 is calculated. Calculation of the intersection point has been fully described heretofore.

After calculation of the intersection point 843, control is passed to operational block 544 where the portion of edge 824 inside of the acceptance region is accepted (the portion outside of the acceptance region is eventually clipped). Control is then passed to operational block 548 where the section module 202 stores the intersection point 843 in a cap edge list 875 (shown in FIG. 8(d)). Control is then passed to decisional block 552 where sectioning module 202 determines whether there are any more edges in the polygon 803. Additional edges exist (edges 817 and 823) and control is passed to operational block 514 where the next edge in the pipeline is processed. In our example, edge 817 is the next edge in the pipeline.

Edge 817 is processed the same as edge 823 described above. However, sectioning module 202 determines that edge 817 is fully inside the acceptance region and accepts edge 817. Control is then returned to operational block 514, where the next edge of polygon 803 is processed. In the present example, we have defined edge 823 as the next edge in the pipeline (edge 823 is also the last edge in polygon 803).

As shown by decisional block 522, edge 823 is found not to lie fully inside the acceptance region. As such, control is passed to decisional block 530 where it is further determined that edge 823 does not lie fully outside the acceptance region. As such, control is passed to operational block 540 where the intersection point 844 of edge 823 and sectioning plane 855 is calculated.

After calculation of the intersection point 844, control is passed to operational block 544 where the portion of edge 824 inside of the acceptance region is accepted. Control is then passed to operation block 548 where the section module 202 stores intersection point 844 in the cap edge list 875. Control is then passed to decisional block 552 where sectioning module 22 determines whether there are any more edges in the polygon 803.

Because edge 823 is the last edge of polygon 803 in the pipeline, control is passed to operational block 555 where the sectioning module 202 operates to reorder the vertices to remove degenerate edges from the clipped polygon and the cap edge list 875. Control is passed to decisional block 558.

As shown by decisional block 558, sectioning module 202 determines whether any other sectioning planes have been defined by the user. Recall a polygon's data base is only processed once and is clipped against all sectioning planes prior to processing of the next polygon. In the present example, no other sectioning planes have been specified and as such control passes to decisional block 561, where the clipped polygon is rendered. Control passes to decisional block 564.

As shown by decisional block 564, more polygons need to be processed. As such, control passes to block 510, wherein the next polygon (polygon 804) in the polyhedron 800 is processed.

For purposes of this example, assume that the edges of polygon 804 are stacked in the pipeline as follows: edge 807, 823, 818, and 826. As shown by operational block 530, sectioning module 202 determines that edge 807 lies fully outside the acceptance region. As such, control is passed to operational block 534 where edge 807 is not accepted. Control is then returned to operational block 514 where the next edge in the pipeline is processed. In the present example, the next edge is edge 823.

As shown by decisional block 522, sectioning module 202 determines that edge 823 does not lie fully inside the acceptance region. As such, control is passed to decisional block 530 where it is further determined that edge 823 does not lie fully outside the acceptance region. As such, control is passed to operational block 540 where an intersection point 846 of edge 823 and sectioning plane 855 is calculated. After calculation of the intersection point 846, control is passed to operational block 544 where the portion of edge 823 inside of the acceptance region is accepted.

Control is then passed to operational block 548 where the section module 202 stores intersection point 846 in the cap edge list 875. Control is then passed to decisional block 552 where sectioning module 202 determines whether there are any more edges in the polygon 804. Additional edges exist (edges 818 and 826, respectively) and control is passed to operational block 514 where the next edge in the pipeline is processed.

In the present example, edge 818 is the next edge in the pipeline. Edge 818 is processed the same as edge 807 described above. However, sectioning module 202 determines that edge 818 is fully inside the acceptance region and accepts edge 818. Control is then returned to operational block 514, where the next edge of polygon 804 is processed. In the present example, we have defined edge 826 as the next edge in the pipeline (edge 826 is also the last edge in polygon 803).

As shown by decisional block 522, edge 826 is found not to lie fully inside the acceptance region. As such, control is passed to decisional block 530 where it is further determined that edge 826 does not lie fully outside the acceptance region. As such, control is passed to operational block 540 where an intersection point 848 of edge 826 and sectioning plane 855 is calculated. After calculation of the intersection point 848, control is passed to operational block 544 where the portion of edge 826 inside of the acceptance region is accepted. Control is then passed to operational block 548 where the section module 202 stores intersection point 848 in the cap edge list 875. Control is then passed to decisional block 552 where sectioning module 202 determines whether there are any more edges in the polygon 804.

Because edge 826 is the last edge in polygon 804, control is passed to operational block 555.

As shown by operational block 555, sectioning module 202 operates to reorder the vertices to remove degenerate edges. Control is passed to decisional block 558.

As shown by decisional block 558, sectioning module 202 determines whether any other sectioning planes have been specified by the designer. In the present example, no other sectioning planes have been specified and as such control is passed to operational block 561.

As shown by operational block 561, the clipped polygon is rendered. Control is then passed to decisional block 564 to operational block 510, wherein the next polygon (polygon 805) in the polyhedron 800 is processed.

For purposes of this example, assume that the edges of polygon 805 are stacked in the pipeline as follows: edge 808, 827, 815, and 826. As shown by decisional block 530, edge 808 lies fully outside the acceptance region. As such, control is passed to operational block 534 where edge 808 is not accepted. Control is then returned to operational block 514 where the next edge is processed. In the present example, the next edge is edge 827.

As shown by operational decisional block 522, edge 827, is found not to lie fully inside the acceptance region. As such, control is passed to decisional block 530 where it is further determined that edge 827 does not lie fully outside the acceptance region. As such, control is passed to operational block 540 where an intersection point 852 of edge 827 and sectioning plane 855 is calculated.

After calculation of the intersection point 852, control is passed to operational block 544 where the portion of edge 827 inside of the acceptance region is accepted. Control is then passed to operation block 548 where the section module 202 stores intersection point 852 in the cap edge list 875. Control is then passed to decisional block 552 where sectioning module 202 determines whether there are any more edges in the polygon 805. Additional edges exist (edges 815 and 826, respectively) and control is passed to operational block 514 where the next edge in the pipeline is processed.

In the present example, edge 815 is the next edge in the pipeline. Edge 815 is processed the same as edge 808 described above. However, sectioning module 202 determines that edge 815 is fully inside the acceptance region and accepts edge 815. Control is then returned to operational block 514, where the next edge of polygon 805 is processed. In the present example, we have defined edge 826 as the next edge in the pipeline (edge 826 is also the last edge in polygon 803).

As shown by operational decisional block 522, edge 826 is found not to lie fully inside the acceptance region. As such, control is passed to decisional block 530 where it is further determined that edge 826 does not lie fully outside the acceptance region. As such, control is passed to operational block 540 where an intersection point 850 of edge 826 and sectioning plane 855 is calculated. After calculation of the intersection point 850, control is passed to operational block 544 where the portion of edge 826 inside of the acceptance region is accepted.

Control is then passed to operation block 548 where the section module 202 stores intersection point 850 in the cap edge list 875. Control is then passed to decisional block 552 where sectioning module 22 determines whether there are any more edges in the polygon 805. Because edge 826 is the last edge in polygon 805, control is passed to operational block 555 where the sectioning module 202 operates to reorder the vertices in the clipped polygon and cap vertex list to remove degenerate edges.

Thereafter, control is passed to decisional block 558 where sectioning module 202 determines whether any other sectioning planes have been specified by the designer. In the present example, no other sectioning planes have been specified and as such control is passed to operational block 561.

As shown by operational block 561, the clipped polygon is rendered. Control is then passed via decisional block 564 to operational block 510, where the next polygon (polygon 806) in the polyhedron 800 is processed.

For purposes of this example, assume that the edges of polygon 806 are stacked in the pipeline as follows: edge 809, 824, 816, and 827. As shown by decisional block 530, sectioning module 202 determines that edge 809 lies fully-outside the acceptance region. As such, control is passed to operational block 534 where edge 809 is not accepted. Control is then returned to operational block 514 wherein the next edge is processed.

In the present example, the next edge is edge 824. As shown by decisional block 522, edge 824 is found not to lie fully inside the acceptance region. As such, control is passed to decisional block 530 where it is further determined that edge 824 does not lie fully outside the acceptance region. As such, control is passed to operational block 540 where an intersection point 856 of edge 824 and sectioning plane 855 is calculated. After calculation of the intersection point 856, control is passed to operational block 544 where the portion of edge 824 inside of the acceptance region is accepted. Control is then passed to operation block 548 where the section module 202 stores intersection point 856 in the cap edge list 875. Control is then passed to decisional block 552 where sectioning module 202 determines whether there are any more edges in the polygon 806. Additional edges exist (edges 816 and 827, respectively) and control is passed to operational block 514 where the next edge in the pipeline is processed. In our example, edge 816 is the next edge in the pipeline.

Edge 816 is processed the same as edge 809 described above. However, sectioning module 202 determines that edge 816 is fully inside the acceptance region and accepts edge 816. Control is then returned to operational block 514, wherein the next edge of polygon 806 is processed.

In the present example, we have defined edge 827 as the next edge in the pipeline (edge 827 is also the last edge in polygon 806). As shown by decisional block 522, edge 827 is found not to lie fully inside the acceptance region. As such, control is passed to decisional block 530 where it is further determined that edge 827 does not lie fully outside the acceptance region. As such, control is passed to operational block 540 where an intersection point 854 of edge 827 and sectioning plane 855 is calculated. After calculation of the intersection point 854, control is passed to operational block 544 where the portion of edge 827 inside of the acceptance region is accepted. Control is then passed to operation block 548 where the section module 202 stores intersection point 854 in the cap edge list 875. Control is then passed to decisional block 552 where sectioning module 202 determines whether there are any more edges in the polygon 806. Because edge 827 is the last edge in polygon 806, control is passed to operational block 555 where the sectioning module 202 operates to reorder the vertices of the clipped polygon and cap edge list to remove degenerate edges.

Thereafter, control is passed to operational block 558 where sectioning module 202 determines whether any other sectioning planes have been specified by the designer. In the present example, no other sectioning planes have been specified and as such control is passed to operational block 561.

As shown by operational block 561, the clipped polygon is rendered. Control is then passed to decisional block 564, wherein the sectioning module 202 determines that no other polygons exist in the polyhedron.

Control is then passed to operational block 582, where the polyhedron capping module 118 passes control from the sectioning module 202 to the cap formation module 204. As will be described herein, after execution of cap formation module 204, polyhedron capping module 118 returns control to operational block 570 of sectioning module 202, where sectioning module 202 determines if there are any additional polyhedron in the pipeline. In practical operation, many polyhedra will be specified by the designer. As such, the above operation of polyhedron capping module 118 is applied until no other polyhedra exist.

Figures 8, 8C:
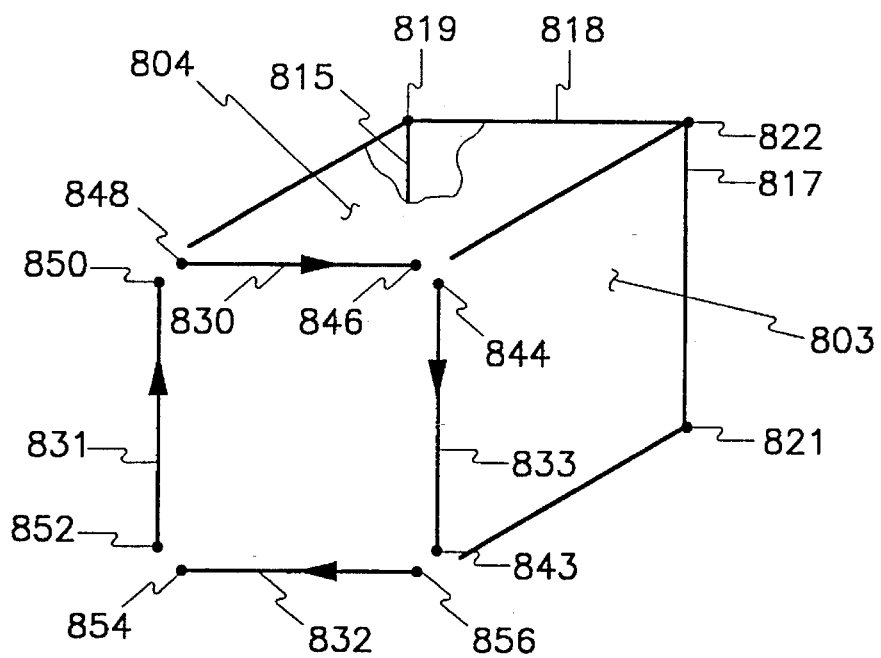
FIG. 8(c) is a perspective view of the sectioned polyhedron of FIG. 8(a)

FIG. 8(c) shows the intersection points that have been calculated for the clipped polygons of polyhedron 800. FIG. 8(d) shows the intersection points stored in the cap edge list 875. As shown and as identified heretofore, the cap edge list 875 has stored the following data: intersection point 843, intersection point 844, intersection point 846, intersection point 848, intersection point 852, intersection point 850, intersection point 856, and intersection point 854.

As shown by operational block 710 of FIG. 7, cap formation module 204 processes the first cap which also corresponds to first cap edge list 875. In the present example, only one sectioning plane has been specified by the user. As such only one cap edge list was generated by sectioning module 202. Therefore, only one cap will be generated by cap formation module 204. Although not applicable to the present example, the cap polygon could consist of sub-polygon caps.

Control is passed to operational block 714 where cap formation module 204 chooses a cap vertex (intersection point) from the cap edge list 875. For purposes of the present example, assume that cap formation module 204 is configured to pick the first cap vertex point stored in the cap edge list. This point would correspond to cap vertex point 843. Cap formation module 204 is further configured to make the chosen vertex 843 the current vertex. Control is then passed to operational block 718.

As shown by operational block 718, cap formation module 204 is configured to label the chosen vertex as the last sub-polygon vertex. Control is then passed to operational block 722.

As shown by operational block 722, cap formation module 204 is configured to examine the cap edge list 875 and find the vertex point that is closest to vertex point 843. In the present example, cap formation module 204 would determine that vertex point 856 is the closest point. Control is then passed to operational block 726.

As shown by operational block 726, vertex 856 is removed from the cap edge list and is made the current vertex. Control is then passed to operational block 730.

Figure 8E:
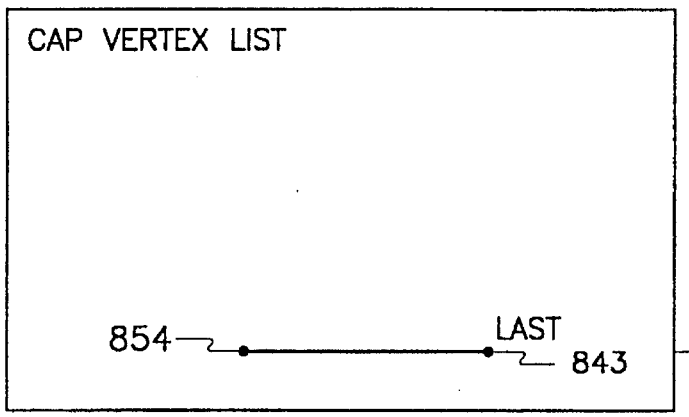
FIG. 8(e)–(h) are sequential illustrations of a cap vertex list showing formation of a cap polygon for the polyhedron of FIG. 8(a)

As shown by operational block 730, cap formation module 204 is then configured to examine the cap edge list 875 and find an edge that has a vertex 856; in the present case, edge entry 4. Accordingly, cap formation module 204 knows that vertex 856 is connected to vertex 854. Cap formation module 204 then stores vertex 854 in the cap vertex list 880 (FIG. 8(e)). Control is then passed to operational block 734.

As shown by operational block 734, cap formation module 204 is configured to make vertex 854 the current vertex and to remove it from the cap edge list 875. Control is then passed to decisional block 738.

As shown by decisional block 738, cap formation module 204 is configured to determine whether any other vertices exist in cap edge list 875. In the present case, additional vertices exist and as such control is passed to decisional block 737.

As shown by decisional block 737, cap formation module 204 is configured to check to see if the current vertex is labeled as the last sub-polygon vertex. In this example the current vertex 854 is not so labeled so control is returned to operational block 722.

As shown by operational block 722, cap formation module 204 reexamines the cap edge list 875 to find the vertex that is closest to vertex 854. In the present case, this would be vertex 852. Control is then passed to operational block 726.

As shown by operational block 726, cap formation module 204 is then configured to make vertex 852 the current vertex and to remove vertex 852 from the cap edge list 875. Control is then passed to operational block 730.

Figure 8F:
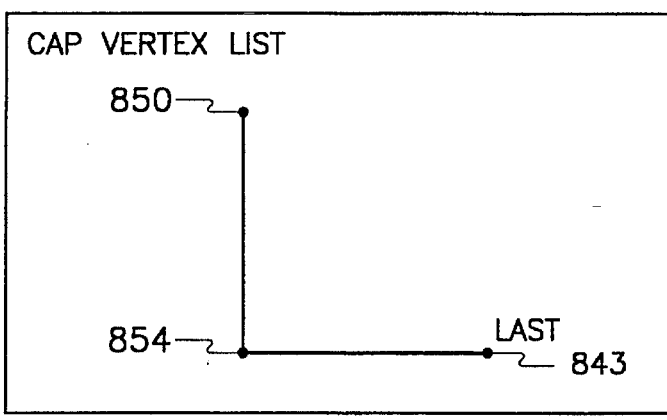

As shown by operational block 730, cap formation module 204 is then configured to examine the cap edge list 875 and find an edge that has a vertex 852; in the present case, edge entry 3. Accordingly, cap formation module 204 knows that vertex 852 is connected to vertex 850. Cap formation module 204 then stores vertex 850 in the cap vertex list 880 (FIG. 8(F)). Control is then passed to operational block 734.

As shown by operational block 734, cap formation module 204 is configured to make vertex 850 the current vertex and to remove it from the cap edge list 875. Control is then passed to decisional block 738.

As shown by decisional block 738, cap formation module 204 is configured to determine whether any other vertices exist in cap edge list 875. In the present case, additional vertices exist and as such control is passed to decisional block 737.

As shown by decisional block 737, cap formation module 204 is configured to check to see if the current vertex is labeled as the last sub-polygon vertex. In this example the current vertex 850 is not so labeled so control is returned to operational block 722.

As shown by operational block 722, cap formation module 204 reexamines the cap edge list 875 to find the vertex that is closest to vertex 850. In the present case, this would be vertex 848. Control is then passed to operational block 726.

As shown by operational block 723, cap formation module 204 is then configured to make vertex 848 the current vertex and to remove vertex 848 from the cap edge list 875. Control is then passed to operational block 730.

Figure 8G:
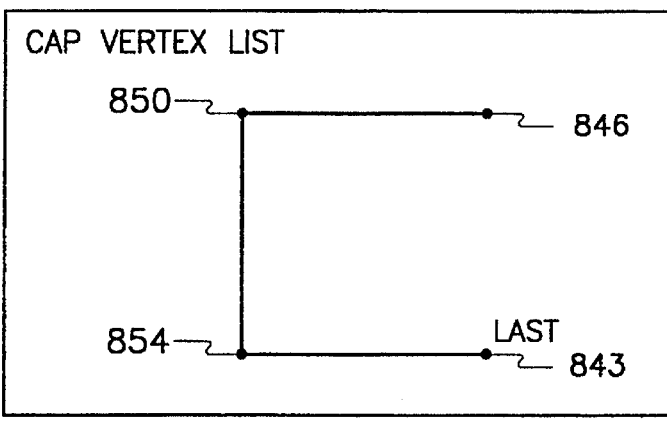

As shown by operational block 730, cap formation module 204 is then configured to examine the cap edge list 875 and find an edge that has vertex 848; in the present case, edge entry 2. Accordingly, cap formation module 204 knows that vertex 848 is connected to vertex 846. Cap formation module 204 then stores vertex 846 in the cap vertex list 880 (FIG. 8(g)). Control is then passed to decisional block 734.

As shown by operational block 734, cap formation module 204 is configured to make vertex 846 the current vertex and to remove it from the cap edge list 875. Control is then passed to decisional block 738.

As shown by decisional block 738, cap formation module 204 is configured to determine whether any other vertices exist in cap edge list 875. In the present case, additional vertices exist and as such control is passed to decisional block 737.

As shown by decisional block 737, cap formation module 204 is configured to check to see if the current vertex is labeled as the last sub-polygon vertex. In this example the current vertex 846 is not so labeled so control is returned to operational block 722.

As shown by operational block 722, cap formation module 204 reexamines the cap edge list 875 to find the vertex that is closest to vertex 846. In the present case, this would be vertex 844. Control is then passed to operational block 726.

AS shown by operational block 723, cap formation module 204 is then configured to make vertex 844 the current vertex and to remove vertex 844 from the cap edge list 875. Control is then passed to operational block 730.

Figure 8H:
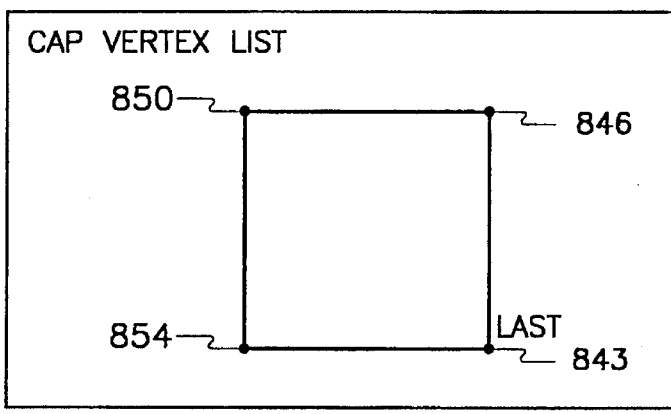

As shown by operational block 730, cap formation module 204 is then configured to examine the cap edge list 875 and find an edge that has vertex 844; in the present case, edge entry 1. Accordingly, cap formation module 204 knows that vertex 844 is connected to vertex 843. Vertex 843 is stored in the cap vertex list 880 (FIG. 8H) by cap formation module 204. Control is then passed to operational block 734.

As shown by operational block 734, cap formation module 204 is configured to make the current vertex edge partner the current vertex. As such, it also removes vertex 843 from the cap edge list 875. Control is then passed to decisional block 738.

As shown by decisional block 738, cap formation module 204 is configured to determine whether any other vertices exist in cap edge list 875. In cases where the cap polygons contain multiple sub-polygons, the cap edge list would not have been empty and control would have flowed to decisional block 737 where the last sub-polygon vertex label on the current vertex would cause control to pass to operational block 714 where a new sub-polygon cap vertex list would be started. In the present case, no additional vertices exist and as such control is passed to operational block 744.

As shown by operational block 744, cap formation module 204 is then configured to transform the cap bounded by vertices 854, 850, 846, and 843 into a data structure compatible with the graphics pipeline architecture. Control is then passed to operational block 746 where the cap polygon is rendered on the clipped polyhedron. Control is then passed to decisional block 748.

As shown by decisional block 744, cap formation module 204 is configured to determine if there are any other caps to be generated. In the present example, only one sectioning plane was defined and as such only one cap edge list and corresponding cap is generated. Control is passed to end block 754 which returns control to decisional block 570 (FIG. 5) of sectioning module 202.

As shown by decisional block 570, sectioning module 204 is then configured to determine if any additional polyhedron exist. In the present example, no other polyhedron exist and control is passed to end block 576 where execution of the polyhedron capping module 118 is terminated.

Figure 9:
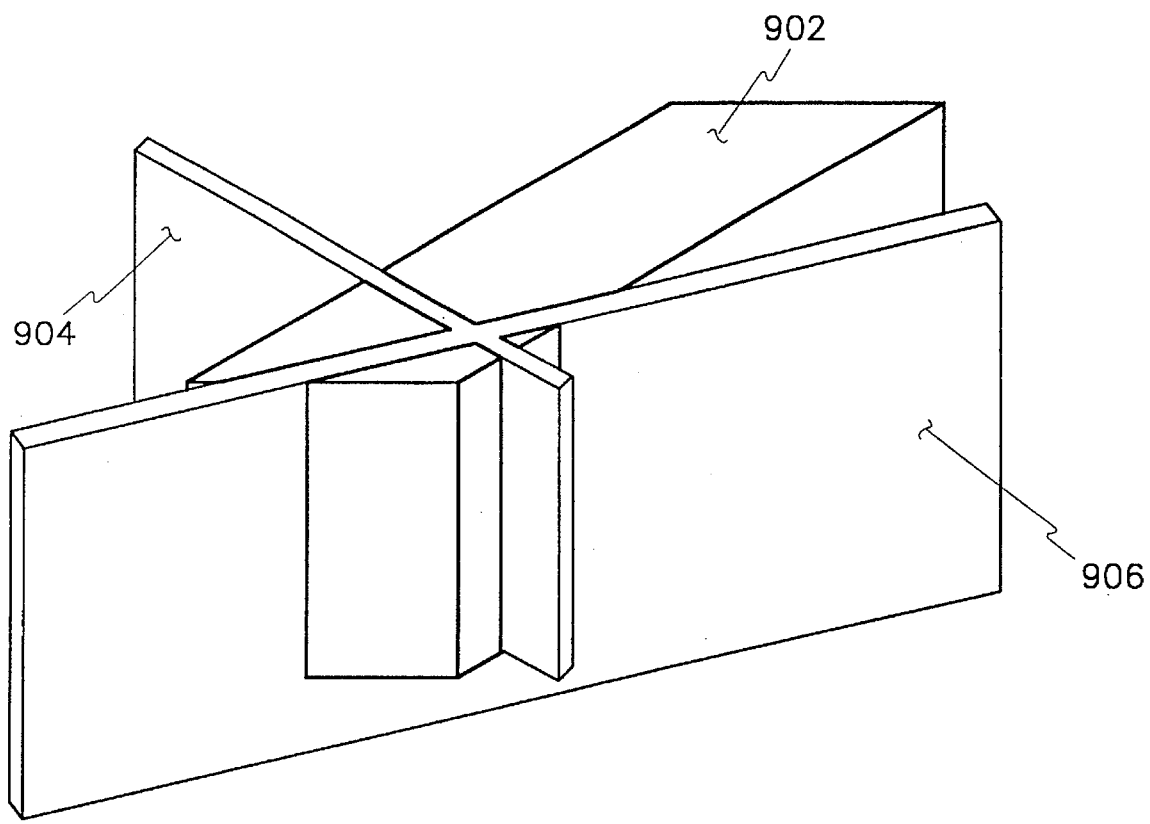
FIG. 9 is a perspective view of a polyhedron having two user defined sectioning plane(s).

In the above example, the polyhedron 800 only has a single sectioning plane 855 specified by the user. However, it may often be the case that the user will specify several sectioning planes. FIG. 9 shows a polyhedron 902 to be sectioned and capped about a first sectioning plane 904 and a second sectioning plane 906. In operation, the polyhedron capping module 118 operates in the same manner. However, note that as the sectioning module 202 of polyhedron capping module 118 is operating, several cap vertex lists will be generated. Each cap polygon is created independently and when a cap polygon is rendered, it is sectioned against all other sectioning planes other than the one it was generated by.

The invention works well if the number of vertices allowed in a polygon is unlimited. In conventional computer systems, however, rendering module 208 has a finite limit on the number of vertices it can process in a single polygon. In the VRX product manufactured by HP, this limit is 255 vertices. Thus, cap polygons with more than 255 vertices cannot be rendered by the VRX product rendering module. An alternative embodiment of this invention could include a Cap subdivision module as part of the cap formation module.

The flowchart for the cap subdivision module is described as follows. Upon entering the module from start block A.02, if a cap is too large to be rendered by the rendering module (in this example, the limit is 255 vertices), decisional block A.04 will pass control to operational block A.06.

Operational block A.06 is then configured to pick a dividing line to divide the cap polygon into two new polygons. The first time that a cap polygon must be clipped, the dividing line may be taken as a fraction of the distance from one edge of the polygon to the other. For example, if an 800 vertex cap is to be subdivided, a good first choice for the dividing line would be to place it 200/800 of the way from the left edge to the right edge and specify the left side of the dividing line to be the "accept" cap polygon. As shown by decisional block A.08, if the picked dividing line did not yield an acceptable capping polygon, another dividing line must be chosen. For any given attempt at division, the second and successive dividing lines may be chosen as the average between the left edge of the cap polygon, and the last dividing line attempt.

Decisional block A.08 operates to decide if the chosen dividing line will produce an acceptable cap. For ease of example, let us assume the acceptance region is the left side of a vertical dividing line. In actuality, the accept side may be, but is not limited to, the "less than x" side of a plane with constant x value, the "less than y" side of a plane with constant y, or the "less than z" side of a plane with constant z. The number of vertices which would result from clipping the cap against the dividing line is: the number of vertices to the left of the dividing line PLUS the number of edges which have one vertex on the left of the dividing line and another on the right. If this number is greater than 255, control will pass to A.06 and another dividing line will be chose. Also at this point, but not shown in the flow chart, the cap subdivision module may protect against infinite loops by aborting the cap subdivision attempt if a dividing line has not been found after 10 consecutive attempts.

If the dividing line will yield an acceptable number of vertices, control passes to block A.10 which may be configured to actually clip the cap polygon against the dividing line. This clip will create an "accept" cap polygon with less than 255 vertices, and a "remaining" cap polygon with an unknown number of vertices. The clipping process and degenerate edge removal are similar to the sectioning code and will not be described here.

Control flows from block A.10 to block A.12 where the accepted cap is actually rendered. After rendering the accepted cap, control passes back to A.04 where the remaining cap is checked to see if it has less than 255 vertices. In the case where it does, control is passed to block A.14 which renders the cap. After block A.14, the cap subdivision module ends execution.

As an example, consider a 600 vertex cap with left and right edges. The first dividing line was placed on third of the distance from the left edge to the right edge of the polygon since 200/600=one third. In this case, 200 is a constant number representing the number of vertices in an "ideal" accept polygon and 600 is the number of vertices in the actual polygon. In this example, we will assume that the accept polygon is calculated to have 350 vertices. Decision block A.08 would thus return control to A.06 where another dividing line is to be chosen. The second dividing line, may be half-way between the first line and the left edge. Now assume that block A.08 discovers 220 vertices on the left of the dividing line and 6 edges which cross the dividing line. The accept polygon will thus have 226 vertices after clipping and the remaining polygon will have 386. The accept polygon will then be rendered and the remaining polygon will be further subdivided.

As discussed previously, the cap edge lists for multiple sectioning planes are all independent of each other. In this way, the designer may close the caps independently of whatever other sectioning planes exist. By way of example only, the designer could close one cap with a blue color, and another with a red color. The designer, however, does still have the option of closing multiple caps in a single command. If only one processing module exists, it will then have to process each cap in series. However, since the caps are independent of each other, if a plurality of processors exist, they may close a plurality of caps using parallelism.

One implementation of a parallel graphics pipeline allows individual polygons from a polyhedron to be processed by one of a plurality of processors. Thus, each processor may need to maintain an edge list for each sectioning plane. With three processors, for example, there may be three edge lists for a single cap for a single sectioning plane.

In order to close caps in parallel, each processing element must determine or be assigned cap(s) for which it will be responsible. After this determination, the processors may need to communicate in order to bring all of the edges for a given cap within the address space of the processor responsible for it. In other words, since the edge list for a single cap polygon may be scattered among a plurality of edge lists, these edge lists need to be coalesced into a single edge list. Once the edges of the caps are readily available to the processors assigned to them, the cap formation modules may perform as previously described with the multiple processors proceeding through vertex matching and transformations in parallel.

ALTERNATIVE EMBODIMENTS

The polyhedron capping module 118 has been described heretofore as operating within the environment of a specific components/subsystems. It will be obvious to one of ordinary skill in the art that polyhedron capping module 118 can be easily added to other computer system not heretofore described. Furthermore, the polyhedron capping module 118 can be easily integrated with any polygon-generating primitives and/or other graphics primitives available to the user.

An excellent discussion on computer graphics is found in Foley, James, et al., *Computer Graphics, Principles and Practice*, Second Edition, Addison-Wesley Publishing Co., New York, N.Y., 1989, which is incorporated by reference in its entirety herein.

As such, the foregoing description is intended primary for purposes of illustration. The polyhedron capping module 118 of the present invention may be embodied in other forms or carried out in other ways without departing from the spirit or scope of the invention. Modifications and variations still falling within the spirit or the scope of the invention will be readily apparent to those of ordinary skill in the art.

What is claimed:

1. A computer graphics pipeline system configure to cap a polyhedron after the polyhedron has been sectioned against a plurality of sectioning planes defined by a user, the polyhedron having a plurality of polygons, each of the polygons having a plurality of edges, the computer graphics system comprises:
    (a) at least one processor configured to process data, and at least one memory unit to store said data wherein said at least one processor operates on each polygon in the polyhedron in a pipelined manner such that each polygon is handled independent of the other polygons in the polyhedron;
    (b) an input device that allows the user to specify the plurality of sectioning planes;
    (c) a polyhedron capping module configured to instruct said at least one processor how to section and cap the polyhedron against the plurality of sectioning planes, wherein each polygon in the polyhedron is sectioned against the plurality of sectioning planes independent of the other polygons in the polyhedron in at pipelined manner, whereby a first polygon in the polyhedron is sectioned against all of the sectioning planes before the processing of a second polygon, wherein said polyhedron capping module comprises,
        (1) a sectioning module configured to section each polygon in the polyhedron against the plurality of sectioning planes in a pipelined manner and to generate new polygon edges and intersection points from the plurality of sectioning planes, and to store said intersection points in one of a plurality of cap edge lists, each of said plurality of cap edge lists for storing said intersection points associated with one of the plurality of sectioning planes, and
        (2) a cap formation module configured to generate for each sectioning plane a cap polygon from said intersection points stored in an associated cap edge list, wherein said cap formation module includes means for examining said intersection points stored in said associated cap edge list and matching a selected intersection point with another intersection point to determine an intersection point that is sufficiently close to said selected intersection point to thereby connect the edges of said associated cap edge list to from said cap polygon; and
    (d) a display device configured to display said capped polyhedron.

2. The computer graphics system of claim 1, wherein said sectioning module comprises a plane intersect module.

3. The computer graphics system of claim 2, wherein said sectioning module further comprises an interpolation module.

4. The computer graphics system of claim 3, wherein said plane intersect module is configured to determined whether the edges of each of the plurality of polygons that make up the polyhedron intersect the at least one sectioning plane.

5. The computer graphics system of claim 4, wherein said interpolation module is configured to calculate an intersection point for each intersection of the plurality of edges and the at least one sectioning plane.

6. The computer graphics system of claim 5, wherein said cap formation module further comprises a match cap vertex module.

7. The computer graphics system of claim 6, wherein said cap formation module further comprises a transformation module.

8. The computer graphics system of claim 7, wherein said match cap vertex module is configured to connect said intersection points stored in said cap edge list into a cap polygon.

9. The computer graphics system of claim 8, wherein said transformation module is configured to transform said cap polygon into a cap polygon data structure compatible for rendering on said display device.

10. A computer graphics pipeline system configured to cap a polyhedron after the polyhedron has been sectioned against a plurality of sectioning planes defined by a user, the polyhedron having a plurality of polygons, each of the polygons having plurality of edges, the computer graphics system comprises:
  (a) processor means for processing dam, and a memory means for storing said data, wherein said at least one processor operates on each polygon in the polyhedron in a pipelined manner such that each polygon is handled independent of the other polygons in the polyhedron;
  (b) input means for allowing the user to define the plurality of sectioning planes;
  (c) capping means for instructing said processor means how to section and cap the polyhedron in response to the plurality of sectioning planes, wherein each polygon in the polyhedron is sectioned against the plurality of sectioning planes independent of the other polygons in the polyhedron in a pipelined manner, whereby a first polygon in the polyhedron is sectioned against all of the sectioning planes before the processing of a second polygon, wherein said capping means further comprises,
    (1) sectioning means for sectioning each polygon in the polyhedron against the plurality of sectioning planes in a pipelined manner and for generating new polygon edges and intersection points from the plurality of sectioning plane, and for storing said intersection points in one of a plurality of cap edge lists, each of said plurality of cap edge lists for storing said intersection points associated with one of the plurality of sectioning planes, and
    (2) cap formation means for generating for each sectioning plane a cap polygon from said intersection-points stored in an associated cap edge list, wherein said cap formation means includes means for examining said intersection points stored in said associated cap edge list and for matching a selected intersection point that is sufficiently close to said selected intersection point to thereby reconnect the edges of said associated cap edge list to form said cap polygon; and
  (d) display means for displaying the polyhedron.

11. The computer graphics system of claim 10, wherein said sectioning means comprises plane intersect means for determining whether the plurality of edges of each of the polygons that make up the polyhedron intersect the at least one sectioning plane.

12. The computer graphics system of claim 11, wherein said sectioning means further comprises an interpolation means for calculating an intersection point for each intersection of the plurality of edges of the polygons and the at least one sectioning plane.

13. The computer graphics system of claim 12, wherein said cap formation means further comprises a match cap vertex means for connecting each of said intersection points in said cap edge list into a cap polygon.

14. The computer graphics system of claim 13, wherein said cap formation module further comprises transformation means for transforming said cap polygon into a cap polygon data structure compatible for rendering on said display device.

15. A computer graphics module configured to operate in a computer graphics pipeline system and to manipulate polyhedron formed from a plurality of polygons having a plurality of edges, the computer graphics module comprises:
  (a) a storage medium that can operate on the computer graphics system;
  (b) a polyhedron capping module, connected to said storage medium, that instructs the computer graphics system how to section and cap the polyhedron against a plurality of sectioning planes, wherein the computer graphics system operates on each polygon in the polyhedron in a pipelined manner such that each polygon is handled independent of the other polygons in the polyhedron, and each polygon in the polyhedron is sectioned against the plurality of sectioning planes independent of the other polygons in the polyhedron whereby a first polygon in the polyhedron is sectioned against all of the sectioning planes before the processing of a second polygon, wherein said polyhedron capping module comprises,
    (1) a sectioning module configured to section each polygon in the polyhedron against the plurality of sectioning planes in a pipelined manner and to generate new polygon edges and intersection points from the plurality of sectioning planes, and to store said intersection points in one of a plurality of cap edge lists, each of said plurality of cap edge lists for storing said intersection points associated with one of the plurality of sectioning planes, and
    (2) a cap formation module configured to generate for each sectioning plane a cap polygon from said intersection points stored in an associated cap edge list, wherein said cap formation module includes means for examining said intersection points stored in said associated cap edge list and matching a selected intersection point with another intersection point to determine an intersection point that is sufficiently close to said selected intersection point to thereby reconnect the edges of said associated cap edge list to form said cap polygon.

16. The computer graphics system module of claim 15, wherein said sectioning module comprises a plane intersect module.

17. The computer graphics module of claim 16, wherein said sectioning module further comprises an interpolation module.

18. The computer graphics module of claim 17, wherein said plane intersect module is configured to determined whether the plurality of edges of each of the polygons intersect the at least one sectioning plane.

19. The computer graphics module of claim 18, wherein said interpolation module is configured to calculate an intersection point for each intersection of the plurality of edges and the at least one sectioning plane.

20. The computer graphics module of claim 19, wherein said cap formation module further comprises a match cap vertex module.

21. The computer graphics module of claim 20, wherein said cap formation module further comprises a transformation module.

22. The computer graphics module of claim 21, wherein said match cap vertex module is configured to connect each of said intersection points into a cap polygon.

23. The computer graphics module of claim 22, wherein said transformation module is configured to transform said cap polygon into a cap polygon data structure compatible for rendering on said display device.

24. A computer method of displaying a polyhedron on a computer graphics system as a solid object after the polyhedron has been sectioned about a plurality of sectioning planes defined by the user of the computer graphics system, the polyhedron being formed from a plurality of polygons each having a plurality of edges, the method comprising the steps of:

(a) section the polyhedron about the plurality of sectioning planes independent of the other polygons in the polyhedron such that each polygon in the polyhedron is operated on in a pipeline manner, whereby a first polygon in the polyhedron is sectioned against all of the sectioning planes before the processing of a second polygon;

(b) generating new polygon pages and intersection points from the plurality of sectioning planes, and storing said intersection points in one of a plurality of cap edge lists, each of said plurality of cap edge lists for storing said intersection points associated with one of the plurality of sectioning planes;

(c) examining said intersection points stored in said one of said plurality of cap edge lists in order to match a selected intersection point with another intersection point to determine an intersection point that is sufficiently close to said selected intersection point to thereby reconnect the edges of said one of said plurality of cap edge lists; and (d) generating a cap polygon for the polygons of the polyhedron that were sectioned against the plurality of sectioning planes, wherein each polygon in the polyhedron is operated on in a pipeline manner.

25. The method of claim 24, wherein said sectioning step comprises the step of determining whether the plurality of edges of the plurality of polygons intersect the at least one sectioning plane.

26. The method of claim 25, wherein said sectioning step further comprises the step of calculating an intersection point for each intersection of the plurality if edges and the at least one sectioning plane.

27. The method of claim 25, wherein the step of generating a cap polygon comprises the step of collecting each of said intersection point stored in said cap edge list.

28. The method of claim 27, wherein the step of generating a cap polygon further comprises the step of connecting each of said intersection points stored in said cap edge list into a cap polygon.

29. The method of claim 28, wherein the step of generating a cap polygon further comprises the step of transforming said cap polygon into a cap polygon data structure compatible for rendering on said display device.

30. The computer graphics system of claim 1, wherein said intersection points are stored in said cap edge list as world coordinates.

* * * * *